United States Patent
Hosseini et al.

(10) Patent No.: US 10,897,765 B2
(45) Date of Patent: Jan. 19, 2021

(54) TECHNIQUES TO PROVIDE INTERFERENCE DIVERSITY IN LOW LATENCY AND HIGH RELIABILITY WIRELESS COMMUNICATION SYSTEMS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/941,844

(22) Filed: Mar. 30, 2018

(65) Prior Publication Data

US 2018/0288771 A1 Oct. 4, 2018

Related U.S. Application Data

(60) Provisional application No. 62/481,079, filed on Apr. 3, 2017.

(51) Int. Cl.
*H04W 72/04* (2009.01)
*H04L 5/00* (2006.01)
*H04J 11/00* (2006.01)

(52) U.S. Cl.
CPC ....... *H04W 72/0466* (2013.01); *H04L 5/0078* (2013.01); *H04L 5/0094* (2013.01);
(Continued)

(58) Field of Classification Search
None
See application file for complete search history.

(56) References Cited

U.S. PATENT DOCUMENTS

2014/0098751 A1 4/2014 Luo et al.
2014/0169565 A1 6/2014 Roman et al.
(Continued)

FOREIGN PATENT DOCUMENTS

WO WO2016120949 A1 8/2016
WO WO-2016160330 A1 10/2016
WO WO2017077705 A1 5/2017

OTHER PUBLICATIONS

NEC: "Extending the Scrambling Sequence for DL/UL Transmissions", R1-156683, 3GPP TSG RAN WG1 Meeting #83, Anaheim, USA, Nov. 15-22, 2015, pp. 1-3.
(Continued)

*Primary Examiner* — Ayaz R Sheikh
*Assistant Examiner* — Sori A Aga
(74) *Attorney, Agent, or Firm* — Holland & Hart LLP

(57) ABSTRACT

Techniques are described for wireless communication. A method for wireless communication at a user equipment (UE) includes receiving an indication of a transmission time interval (TTI) configuration; determining a scrambling sequence initialization timing based at least in part on a TTI numerology associated with the TTI configuration; and communicating with the base station on a downlink or an uplink according to a scrambling sequence initialized based at least in part on the determined scrambling sequence initialization timing. The TTI configuration is one TTI configuration in a plurality of available TTI configurations for communicating with a base station.

30 Claims, 13 Drawing Sheets

(52) U.S. Cl.
CPC ..... *H04W 72/042* (2013.01); *H04W 72/0446* (2013.01); *H04J 11/0023* (2013.01)

(56) References Cited

U.S. PATENT DOCUMENTS

| | | | |
|---|---|---|---|
| 2016/0128095 A1 | 5/2016 | Damnjanovic et al. | |
| 2017/0048014 A1 | 2/2017 | Lampinen et al. | |
| 2018/0279341 A1* | 9/2018 | Yamada | H04L 1/0042 |
| 2019/0045424 A1* | 2/2019 | Rune | H04W 72/0446 |
| 2019/0116007 A1* | 4/2019 | Yi | H04W 4/42 |

OTHER PUBLICATIONS

International Search Report and Written Opinion—PCT/US2018/025717—ISA/EPO—dated Jul. 18, 2018.

Mediatek Inc Asustek: "MAC Layer Abstraction for Multiple Numerologies", 3GPP Draft; R2-1703526 MAC Layer Abstraction for Multiple Numerologies, 3rd Generation Partnership Project (3GPP), Mobile Competence Centre; 650, Route Des Lucioles; F-06921 Sophia-Antipolis Cedex; France vol. RAN WG2, No. Spokane, USA; Apr. 3, 2017-Apr. 7, 2017 Mar. 25, 2017, XP051254484, Retrieved from the Internet: URL:http://www.3gpp.org/ftp/tsg_ran/WG2_RL2/TSGR2_97bis/Docs/ [retrieved on Mar. 25, 2017], 3 pages.

Nokia et al., "Logical Channel to Numerologies/TTI Length Mapping", 3GPP Draft; R2-1701332 Logical Channel to Numerologies/TTI Length Mapping, 3rd Generation Partnership Project (3GPP), Mobile Competence Centre; 650, Route Des Lucioles; F-06921 Sophia-Antipolis Cedex; France vol. RAN WG2, No. Athens, Greece; Feb. 13, 2017-Feb. 17, 2017 Feb. 12, 2017, XP051211996, Retrieved from the Internet: URL:http://www.3gpp.org/ftp/Meetings_3GPP_SYNC/RAN2/Docs/ [retrieved on Feb. 12, 2017], 3 pages.

\* cited by examiner

TECHNIQUES TO PROVIDE INTERFERENCE DIVERSITY IN LOW LATENCY AND HIGH RELIABILITY WIRELESS COMMUNICATION SYSTEMS

CROSS REFERENCES

The present Application for Patent claims priority to U.S. Provisional Patent Application No. 62/481,079 by Hosseini, et al., entitled "Techniques To Provide Interference Diversity In Low Latency And High Reliability Wireless Communication Systems," filed Apr. 3, 2017, assigned to the assignee hereof.

BACKGROUND

Field of the Disclosure

The present disclosure, for example, relates to wireless communication systems, and more particularly to techniques to provide interference diversity in low latency and high reliability wireless communication systems.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of user equipment (UEs) on downlink channels (e.g., for transmissions from a base station to a UE) and uplink channels (e.g., for transmissions from a UE to a base station).

In some communication systems, a base station may scramble downlink transmissions sent to a UE, or a UE may scramble uplink transmissions sent to a base station.

SUMMARY

In some low latency and/or high reliability wireless communication systems (e.g., in Long-Term Evolution (LTE) ultra low latency (ULL) systems, LTE highly ultra reliable low latency communication (HRLLC) systems, or new radio (NR) ultra-reliable low latency communication (URLLC) systems), communication diversity may be necessary to achieve target or required latency or reliability metrics. One form of communication diversity is interference diversity. Interference diversity may ensure that the interference pattern/power affecting communications from one transmission opportunity to the next varies, so that a device (e.g., a base station or a user equipment (UE)) that fails to decode a transmission due to interference in one transmission opportunity may be able to decode the transmission (e.g., a retransmission) in another transmission opportunity. In some examples, interference diversity may be achieved by transmitting in different frequency bands, with different powers, or using different beams/ports/etc. In other examples, interference diversity may be achieved by applying different scrambling sequences to the data, control, or demodulation reference signals (DMRSs) transmitted in different transmission opportunities. The present disclosure describes techniques that may be used to achieve interference diversity using different scrambling sequences.

In one example, a method for wireless communication at a UE is described. The method may include receiving an indication of a transmission time interval (TTI) configuration; determining a scrambling sequence initialization timing based at least in part on a TTI numerology associated with the TTI configuration; and communicating with the base station on a downlink or an uplink according to a scrambling sequence initialized based at least in part on the determined scrambling sequence initialization timing. The TTI configuration may be one TTI configuration in a plurality of available TTI configurations for communicating with a base station.

In one example, an apparatus for wireless communication at a UE is described. The apparatus may include a processor, memory in electronic communication with the processor, and instructions stored in the memory. The instructions may be executable by the processor to receive an indication of a TTI configuration; to determine a scrambling sequence initialization timing based at least in part on a TTI numerology associated with the TTI configuration; and to communicate with the base station on a downlink or an uplink according to a scrambling sequence initialized based at least in part on the determined scrambling sequence initialization timing. The TTI configuration may be one TTI configuration in a plurality of available TTI configurations for communicating with a base station.

In one example, another apparatus for wireless communication at a UE is described. The apparatus may include means for receiving an indication of a TTI configuration; means for determining a scrambling sequence initialization timing based at least in part on a TTI numerology associated with the TTI configuration; and means for communicating with the base station on a downlink or an uplink according to a scrambling sequence initialized based at least in part on the determined scrambling sequence initialization timing. The TTI configuration may be one TTI configuration in a plurality of available TTI configurations for communicating with a base station.

In one example, a non-transitory computer-readable medium storing computer-executable code for wireless communication at a UE is described. The code may be executable by a processor to receive an indication of a TTI configuration; to determine a scrambling sequence initialization timing based at least in part on a TTI numerology associated with the TTI configuration; and to communicate with the base station on a downlink or an uplink according to a scrambling sequence initialized based at least in part on the determined scrambling sequence initialization timing. The TTI configuration may be one TTI configuration in a plurality of available TTI configurations for communicating with a base station.

In some examples of the method, apparatus, and non-transitory computer-readable medium described above, the plurality of available TTI configurations may include a first TTI configuration based at least in part on a maximum length TTI, and a second TTI configuration based at least in part on a shortened TTI. The shortened TTI may have a shorter duration than the maximum length TTI. In these examples, the method, apparatus, and non-transitory computer-readable medium may further include processes, features, means, or instructions for identifying the TTI configuration as the second TTI configuration, and identifying the TTI numerology as a shortened TTI index.

In some examples of the method, apparatus, and non-transitory computer-readable medium described above, the plurality of available TTI configurations may include a first TTI configuration based at least in part on a slot, and a second TTI configuration based at least in part on a mini-slot. The mini-slot may have a shorter duration than the slot. In these examples, the method, apparatus, and non-transitory computer-readable medium may further include processes, features, means, or instructions for identifying the TTI configuration as the second TTI configuration, and identifying the TTI numerology as a mini-slot index.

In some examples of the method, apparatus, and non-transitory computer-readable medium described above, the plurality of available TTI configurations may include at least one of: a first TTI configuration associated with LTE ULL communication, a second TTI configuration associated with LTE HRLLC, a third TTI configuration associated with NR URLLC, or a combination thereof. In these examples, the method, apparatus, and non-transitory computer-readable medium may further include processes, features, means, or instructions for identifying the TTI configuration associated with the at least one resource grant as the first TTI configuration, the second TTI configuration, or the third TTI configuration.

In some examples of the method, apparatus, and non-transitory computer-readable medium, the TTI numerology may include a shortened TTI index, a mini-slot index, or a symbol index.

In some examples of the method, apparatus, and non-transitory computer-readable medium described above, the scrambling sequence initialization timing may be associated with a downlink data channel, and communicating according to the scrambling sequence may include descrambling the downlink data channel based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the downlink data channel is associated with an initial transmission or with a particular retransmission in a set of one or more retransmissions.

In some examples of the method, apparatus, and non-transitory computer-readable medium described above, the scrambling sequence initialization timing may be associated with a downlink control channel, and communicating according to the scrambling sequence may include descrambling the downlink control channel based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for identifying at least one cyclic shift associated with the downlink control channel based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the downlink control channel is associated with an initial transmission or with a particular retransmission in a set of one or more retransmissions.

In some examples of the method, apparatus, and non-transitory computer-readable medium described above, the scrambling sequence initialization timing may be associated with a downlink demodulation reference signal (DMRS), and communicating according to the scrambling sequence may include descrambling the downlink DMRS based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the downlink DMRS is associated with an initial transmission or with a particular retransmission in a set of one or more retransmissions.

In some examples of the method, apparatus, and non-transitory computer-readable medium described above, the scrambling sequence initialization timing may be associated with an uplink data channel, and communicating according to the scrambling sequence may include scrambling the uplink data channel based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the uplink data channel is associated with an initial transmission or with a particular retransmission in a set of one or more retransmissions.

In some examples of the method, apparatus, and non-transitory computer-readable medium described above, the scrambling sequence initialization timing may be associated with an uplink control channel, and communicating according to the scrambling sequence may include scrambling the uplink control channel based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary.

In some examples of the method, apparatus, and non-transitory computer-readable medium described above, the scrambling sequence initialization timing may be associated with an uplink DMRS, and communicating according to the scrambling sequence may include determining a hopping sequence of the uplink DMRS based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. In some examples of the method, apparatus, and non-transitory computer-readable medium described above, initializing the scrambling sequence may include initializing at least one of a sequence-group number on which the hopping sequence is based, a sequence number on which the hopping sequence is based, or a combination thereof. Some examples of the method, apparatus, and non-transitory computer-readable medium may further include processes, features, means, or instructions for cyclically shifting the uplink DMRS based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the uplink DMRS is associated with an initial transmission or with a particular retransmission in a set of one or more retransmissions.

In one example, a method for wireless communication at a base station is described. The method may include selecting a TTI configuration for communicating with a UE on a downlink or an uplink; determining a scrambling sequence initialization timing based at least in part on a TTI numerology associated with the selected TTI configuration; and communicating with the UE on the downlink or the uplink according to a scrambling sequence initialized based at least in part on the determined scrambling sequence initialization timing. The TTI configuration may be one TTI configuration in a plurality of available TTI configurations for communicating with the UE.

In one example, an apparatus for wireless communication at a base station is described. The apparatus may include a processor, memory in electronic communication with the processor, and instructions stored in the memory. The instructions may be executable by the processor to select a TTI configuration for communicating with a UE on a downlink or an uplink; to determine a scrambling sequence initialization timing based at least in part on a TTI numerology associated with the selected TTI configuration; and to communicate with the UE on the downlink or the uplink according to a scrambling sequence initialized based at least in part on the determined scrambling sequence initialization timing. The TTI configuration may be one TTI configuration in a plurality of available TTI configurations for communicating with the UE.

In one example, another apparatus for wireless communication at a base station is described. The apparatus may include means for selecting a TTI configuration for communicating with a UE on a downlink or an uplink; means for determining a scrambling sequence initialization timing based at least in part on a TTI numerology associated with the selected TTI configuration; and means for communicating with the UE on the downlink or the uplink according to a scrambling sequence initialized based at least in part on the determined scrambling sequence initialization timing. The TTI configuration may be one TTI configuration in a plurality of available TTI configurations for communicating with the UE.

In one example, a non-transitory computer-readable medium storing computer-executable code for wireless communication at a base station is described. The code may be executable by a processor to select a TTI configuration for communicating with a UE on a downlink or an uplink; to determine a scrambling sequence initialization timing based at least in part on a TTI numerology associated with the selected TTI configuration; and to communicate with the UE on the downlink or the uplink according to a scrambling sequence initialized based at least in part on the determined scrambling sequence initialization timing. The TTI configuration may be one TTI configuration in a plurality of available TTI configurations for communicating with the UE.

Some examples of the method, apparatus, and non-transitory computer-readable medium described above may further include processes, features, means, or instructions for transmitting an indication of the selected TTI configuration to the UE.

In some examples of the method, apparatus, and non-transitory computer-readable medium described above, the plurality of available TTI configurations may include a first TTI configuration based at least in part on a maximum length TTI, and a second TTI configuration based at least in part on a shortened TTI. The shortened TTI may have a shorter duration than the maximum length TTI, and the selected TTI configuration may include the second TTI configuration. In these examples, the method, apparatus, and non-transitory computer-readable medium may further include processes, features, means, or instructions for identifying the TTI numerology as a shortened TTI index.

In some examples of the method, apparatus, and non-transitory computer-readable medium described above, the plurality of available TTI configurations may include a first TTI configuration based at least in part on a slot, and a second TTI configuration based at least in part on a mini-slot. The mini-slot may have a shorter duration than the slot, and the selected TTI configuration may include the second TTI configuration. In these examples, the method, apparatus, and non-transitory computer-readable medium may further include processes, features, means, or instructions for identifying the TTI numerology as a mini-slot index.

In some examples of the method, apparatus, and non-transitory computer-readable medium described above, the plurality of available TTI configurations may include at least one of: a first TTI configuration associated with LTE ULL communication, a second TTI configuration associated with LTE HRLLC, a third TTI configuration associated with NR URLLC, or a combination thereof, and the selected TTI configuration may include the first TTI configuration, the second TTI configuration, or the third TTI configuration.

In some examples of the method, apparatus, and non-transitory computer-readable medium described above, the TTI numerology may include a shortened TTI index, a mini-slot index, or a symbol index.

In some examples of the method, apparatus, and non-transitory computer-readable medium described above, the scrambling sequence initialization timing may be associated with a downlink data channel, and communicating according to the scrambling sequence may include scrambling the downlink data channel based at least in part on the scrambling sequence. Some examples of the method, apparatus, and non-transitory computer-readable medium may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium may further include processes, features, means, or instructions for initializing the scrambling sequence based at least in part on whether the downlink data channel is associated with an initial transmission or with a particular retransmission in a set of one or more retransmissions.

In some examples of the method, apparatus, and non-transitory computer-readable medium described above, the scrambling sequence initialization timing may be associated with a downlink control channel, and communicating according to the scrambling sequence may include scrambling the downlink control channel based at least in part on the scrambling sequence. Some examples of the method, apparatus, and non-transitory computer-readable medium described above may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium described above may further include processes, features, means, or instructions for cyclically shifting the downlink control channel based at least in part on a shortened TTI index, a mini-slot index, or a symbol index, at each shortened TTI boundary, mini-slot boundary, or symbol boundary. Some examples of the method, apparatus, and non-transitory computer-readable medium described above may further include processes, features, means, or instructions for initializing the scrambling sequence based at least in part on whether the downlink control channel is associated with an initial transmission or with a particular retransmission in a set of one or more retransmissions.

In some examples of the method, apparatus, and non-transitory computer-readable medium described above, the scrambling sequence initialization timing may be associated with a downlink DMRS, and communicating according to the scrambling sequence may include scrambling the downlink DMRS based at least in part on the scrambling sequence. Some examples of the method, apparatus, and non-transitory computer-readable medium described above may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium described above may further include processes, features, means, or instructions for initializing the scrambling sequence based at least in part on whether the downlink DMRS is associated with an initial transmission or with a particular retransmission in a set of one or more retransmissions.

In some examples of the method, apparatus, and non-transitory computer-readable medium described above, the scrambling sequence initialization timing may be associated with an uplink data channel, and communicating according to the scrambling sequence may include descrambling the uplink data channel based at least in part on the scrambling sequence. Some examples of the method, apparatus, and non-transitory computer-readable medium described above may further include processes, features, means, or instructions for initializing the scrambling sequence based at least in part on a shortened TTI index, a mini-slot index, or a symbol index, at each shortened TTI boundary, mini-slot boundary, or symbol boundary. Some examples of the method, apparatus, and non-transitory computer-readable medium described above may further include processes, features, means, or instructions for initializing the scrambling sequence based at least in part on whether the uplink data channel is associated with an initial transmission or with a particular retransmission in a set of one or more retransmissions.

In some examples of the method, apparatus, and non-transitory computer-readable medium described above, the scrambling sequence initialization timing may be associated with an uplink control channel, and communicating according to the scrambling sequence may include descrambling the uplink control channel based at least in part on the scrambling sequence. Some examples of the method, apparatus, and non-transitory computer-readable medium described above may further include processes, features, means, or instructions for initializing the scrambling sequence based at least in part on a shortened TTI index, a mini-slot index, or a symbol index, at each shortened TTI boundary, mini-slot boundary, or symbol boundary.

In some examples of the method, apparatus, and non-transitory computer-readable medium described above, the scrambling sequence initialization timing may be associated with an uplink DMRS, and communicating according to the scrambling sequence may include determining a hopping sequence of the uplink DMRS based at least in part on the scrambling sequence. Some examples of the method, apparatus, and non-transitory computer-readable medium described above may further include processes, features, means, or instructions for initializing the scrambling sequence based at least in part on a shortened TTI index, a mini-slot index, or a symbol index, at each shortened TTI boundary, mini-slot boundary, or symbol boundary. In some examples of the method, apparatus, and non-transitory computer-readable medium, initializing the scrambling sequence may include initializing at least one of a sequence-group number on which the hopping sequence is based, a sequence number on which the hopping sequence is based, or a combination thereof. Some examples of the method, apparatus, and non-transitory computer-readable medium described above may further include processes, features, means, or instructions for identifying at least one cyclic shift associated with the uplink DMRS based at least in part on a shortened TTI index, a mini-slot index, or a symbol index, at each shortened TTI boundary, mini-slot boundary, or symbol boundary. Some examples of the method, apparatus, and non-transitory computer-readable medium described above may further include processes, features, means, or instructions for initializing the scrambling sequence based at least in part on whether the uplink DMRS is associated with an initial transmission or with a particular retransmission in a set of one or more retransmissions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, apparatus, methods, and computer-readable mediums for providing interference diversity in low latency and high reliability wireless communication systems are described. The systems, apparatus, methods, and computer-readable mediums enable a base station and a user equipment (UE) to communicate on a downlink and/or uplink according to a scrambling sequence initialized based at least in part on a determined scrambling sequence initialization timing. The scrambling sequence initialization timing may be determined based at least in part on a transmission time interval (TTI) numerology associated with a TTI configuration. In some examples, the TTI configuration may be a TTI configuration associated with Long-Term Evolution (LTE) ultra low latency (ULL) communication, LTE highly ultra reliable low latency communication (HRLLC), or new radio (NR) ultra-reliable low latency communication (URLLC). In some examples, the TTI numerology may include a shortened TTI index, a mini-slot index, or a symbol index.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
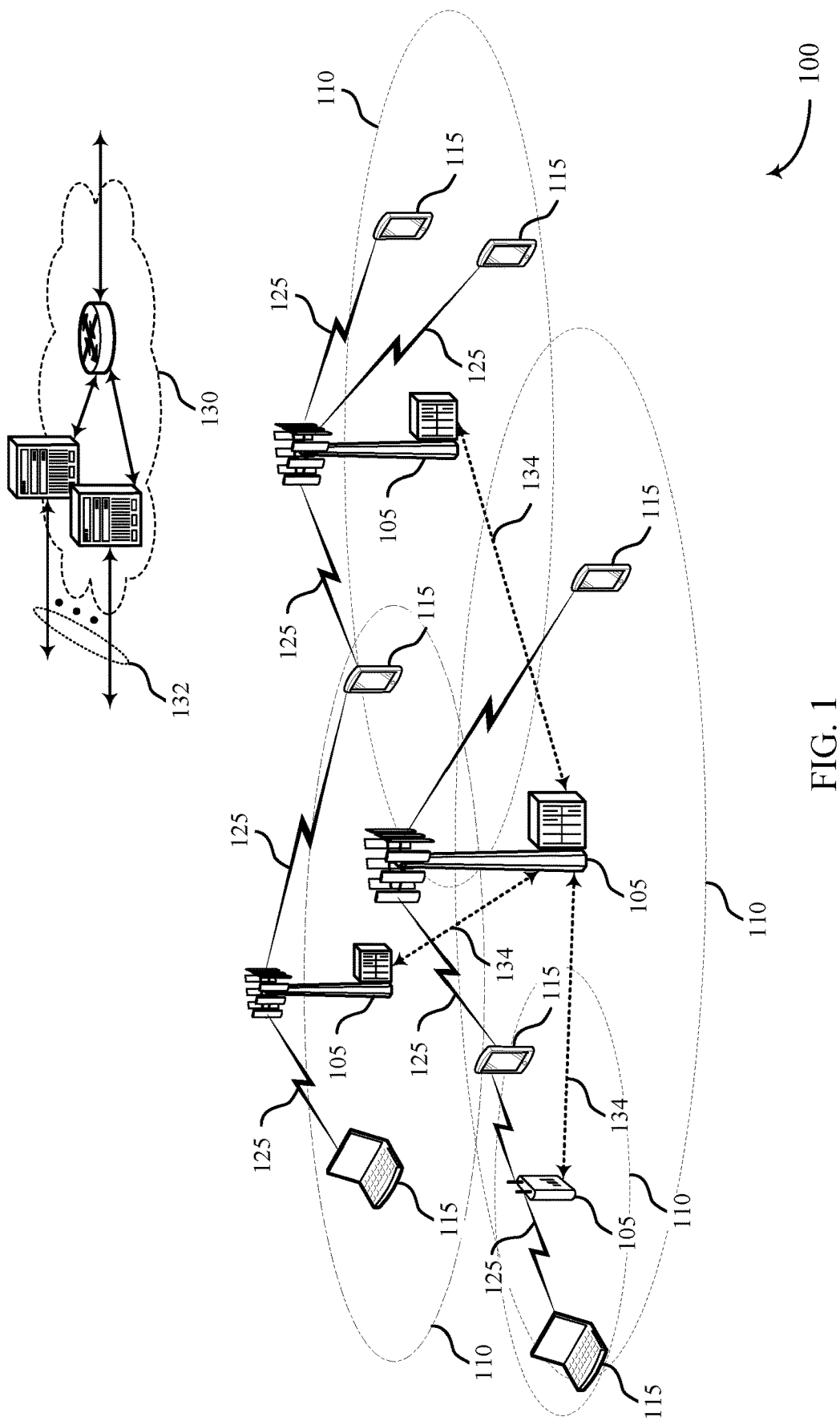
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 includes base stations 105, UEs 115, and a core network 130. In some examples, the wireless communication system 100 may include a LTE, LTE-A, NR, mmW, and/or 5G network. In some cases, wireless communication system 100 may support enhanced broadband communications, ultra-reliable (i.e., mission critical) communications, low latency communications, and communications with low-cost and low-complexity devices (e.g., LTE ULL communication, LTE HRLLC, or NR URLLC).

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some examples of the wireless communication system 100, downlink transmissions (e.g., transmissions of a downlink data channel, downlink control channel, or downlink DMRS) may be scrambled by a base station 105 and descrambled by a UE 115. In some examples, uplink transmissions (e.g., transmissions of an uplink data channel, uplink control channel, or uplink DMRS) may be scrambled by a UE 115 and descrambled by a base station 105. As described in the present disclosure, a UE 115 may receive an indication of a TTI configuration; determine a scrambling sequence initialization timing based at least in part on a TTI numerology associated with the TTI configuration; and communicate with a base station 105 on a downlink or an uplink according to a scrambling sequence initialized based at least in part on the determined scrambling sequence initialization timing. The TTI configuration may be one TTI configuration in a plurality of available TTI configurations for communicating with the base station 105. As also described in the present disclosure, a base station 105 may select a TTI configuration for communicating with a UE 115 on a downlink or an uplink; determine a scrambling sequence initialization timing based at least in part on a TTI numerology associated with the selected TTI configuration; and communicate with the UE 115 on the downlink or the uplink according to a scrambling sequence initialized based at least in part on the determined scrambling sequence initialization timing.

In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

Figure 2:
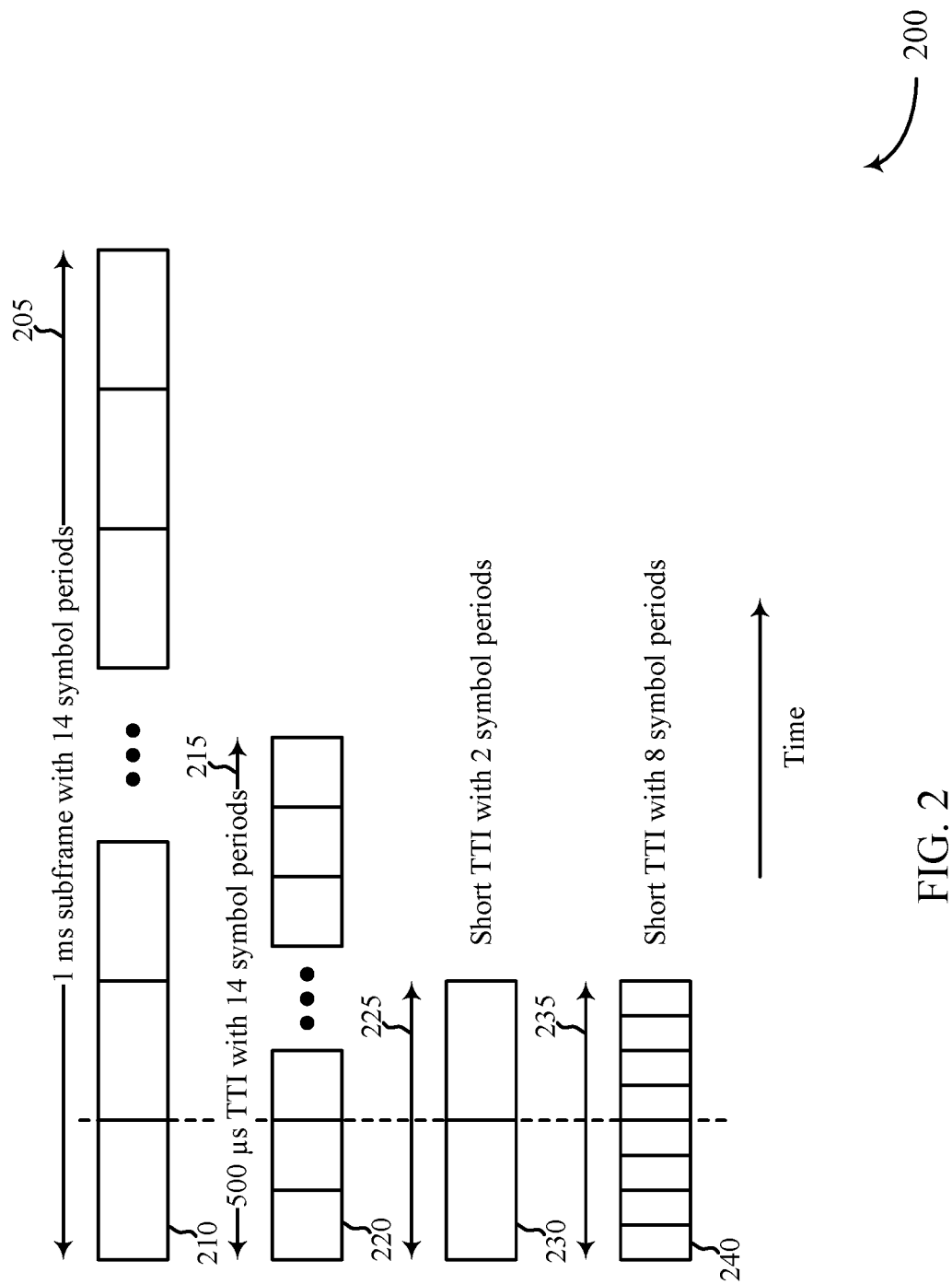
FIG. 2 shows different TTI configurations that may be used for communications between a base station and a UE, in accordance with various aspects of the present disclosure.

FIG. 2 shows different TTI configurations 200 that may be used for communications between a base station and a UE, in accordance with various aspects of the present disclosure. In some examples, the base station and UE may be examples of aspects of one or more the base stations or UEs described with reference to FIG. 1.

A first TTI configuration may include a number of 1 millisecond (ms) subframes 205 (e.g., 1 ms TTIs). Each subframe 205 may include a plurality of orthogonal frequency division multiplexing (OFDM) symbol periods 210 (e.g., 14 OFDM symbol periods). A first subset of OFDM symbol periods 210 within the subframe 205 may define a first slot, and a second subset of OFDM symbol periods 210 within the subframe 205 may define a second slot.

A second TTI configuration may include a number of 200 microsecond (µs) TTIs 215 transmitted end-to-end within a slot of a subframe 205. Each 200 µs TTI 215 may include a plurality of shortened OFDM symbol periods 220 (e.g., 14 OFDM symbol periods).

A third TTI configuration may include a number of shortened TTIs 225, with each shortened TTI 225 including two OFDM symbol periods 230 within a subframe 205.

A fourth TTI configuration may include a number of shortened TTIs 235, with each shortened TTI 235 including eight shortened OFDM symbol periods 240.

The TTI configurations shown in FIG. 2 are all aligned at the OFDM symbol periods 210, and are usable within a LTE/LTE-A radio frame structure. A NR network may refer to a smallest usable TTI, such as the 2-symbol period shortened TTI 225 or the 8-symbol period shortened TTI 235, as a mini-slot. In some examples, a wireless communication system capable of switching between different TTI configurations, such as two or more of the TTI configurations shown in FIG. 2, may switch from one TTI configuration to another TTI configuration at an integer OFDM symbol period boundary, instead of (or in addition to) switching TTI configurations at a subframe boundary. Such switching can enable a base station to multiplex long and short TTI configurations, and can provide a base station with flexibility to multiplex low latency communications with spectral efficient, delay-tolerant communications.

In some cases, interference diversity may be provided by determining a scrambling sequence initialization timing based at least in part on a TTI numerology associated with a TTI configuration (e.g., one of the TTI configurations described with reference to FIG. 2). The TTI configuration, and thus the TTI numerology, may be selected by a base station and indicated to a UE. The base station and UE may then communicate on a downlink or an uplink according to the selected/received TTI configuration.

In an LTE DL, each codeword q of a data channel may be scrambled by a scrambling sequence c(q)(i) according to:

$$\tilde{b}^{(q)}(i) = (b^{(q)}(i) + c^{(q)}(i)) \bmod 2,$$

with the scrambling sequence generator being initialized at the start of each subframe according to:

$$c_{init} = n_{RNTI} \cdot 2^{14} + q \cdot 2^{13} + \left\lfloor \frac{n_s}{2} \right\rfloor \cdot 2^9 + N_{ID}^{cell}.$$

Such a scrambling sequence initialization may not be desirable for a ULL, HRLLC, or URLLC DL because ULL, HRLLC, and URLLC traffic types have a TTI duration that is much shorter than an LTE subframe duration or NR slot duration, and if the scrambling sequence is initialized at each TTI boundary, the same scrambling sequence may be used for multiple DL transmission opportunities.

In order to gain from interference diversity, scrambling sequence generators for ULL, HRLLC, or URLLC DL data channels may be initialized based at least in part on ULL or HRLLC shortened TTI (sTTI) indices, or NR URLLC mini-slot indices. Alternatively, the scrambling sequence may depend on each symbol index. For example, a scrambling sequence generator for ULL, HRLLC, or URLLC DL data channels may be initialized based at least in part on a product of symbol/sTTI/mini-slot index (e.g., one of these) and $N_{ID}^{cell}$. Furthermore, the scrambling sequence may depend on whether it is used for an initial transmission or a retransmission. Hence, when an initial transmission and retransmission (or any two retransmissions) are made within sTTIs/mini-slots/symbols having the same index, the interference for the two transmissions will likely be different. The techniques described in this paragraph may be applied to ULL, HRLLC, or URLLC DL and/or UL data channel transmissions.

In an LTE DL control channel, a block of control channel bits may be scrambled by a scrambling sequence initialized at the start of each subframe according to:

$$c_{init} = \left\lfloor \frac{n_s}{2} \right\rfloor \cdot 2^9 + N_{ID}^{cell}.$$

After modulation, layer mapping and precoding, and permutation and mapping to resource elements, the permuted quadruplets for each port p may be cyclically shifted as:

$$\overline{w}^{(p)}(i) = w^{(p)} \cdot ((i + n_{ID}^{cell})) \bmod M_{quad},$$

where $M_{quad} = M_{symb}/4$.

Such a scrambling sequence initialization may not be desirable for a ULL, HRLLC, or URLLC DL control channel because ULL, HRLLC, and URLLC DL control channels may have durations that are much shorter than the durations of LTE DL control channels.

In order to gain from interference diversity, scrambling sequence generators for ULL, HRLLC, or URLLC DL control channels may be initialized based at least in part on ULL or HRLLC sTTI indices, or NR URLLC mini-slot indices. Alternatively, the scrambling sequence may depend on each symbol index. For example, a scrambling sequence generator for ULL, HRLLC, or URLLC DL control channels may be initialized based at least in part on a product of symbol/sTTI/mini-slot index (e.g., one of these) and $N_{ID}^{cell}$. The cyclic shift for a ULL, HRLLC, or URLLC DL control channel may also be based at least in part on ULL or HRLLC sTTI indices, or NR URLLC mini-slot indices, or symbol indices. Furthermore, the scrambling sequence or cyclic shift may depend on whether it is used for an initial transmission or a retransmission. Hence, when an initial transmission and retransmission (or any two retransmissions) are made within sTTIs/mini-slots/symbols having the same index, the interference for the two transmissions will likely be different. However, when the scrambling sequence or cyclic shift depends on whether a DL control channel transmission is an initial transmission or a particular retransmission, a UE may have to test multiple hypotheses (e.g., one for each DL control channel transmission/retransmission) for the scrambling sequence or cyclic shift used to receive a DL control channel.

In an LTE PUCCH format 2, 2a, 2b, 3, 4, or 5 transmission, a sequence of bits may be scrambled by a scrambling sequence c(i) according to:

$$\tilde{b}(i) = (b(i) + c(o)) \bmod 2,$$

with the scrambling sequence generator being initialized at the start of each subframe according to:

$$c_{init} = \left(\left\lfloor \frac{n_s}{2} \right\rfloor + 1\right) \cdot (2N_{ID}^{cell} + 1) \cdot 2^{16} + n_{RNTI}.$$

Such a scrambling sequence initialization may not be desirable for a ULL, HRLLC, or URLLC UL control channel because ULL, HRLLC, and URLLC UL control channels may have durations that are much shorter than the durations of LTE UL control channels (e.g., PUCCHs).

In order to gain from interference diversity, scrambling sequence generators for ULL, HRLLC, or URLLC PUCCHs may be initialized based at least in part on ULL or HRLLC sTTI indices, or NR URLLC mini-slot indices. Alternatively, the scrambling sequence may depend on each symbol index. For example, a scrambling sequence generator for ULL, HRLLC, or URLLC DL control channels (physical uplink control channel (PUCCH) or enhanced PUCCH (ePUCCH)) may be initialized based at least in part on a product of symbol/sTTI/mini-slot index (e.g., one of these) and $N_{ID}^{cell}$. The cyclic shift for a ULL, HRLLC, or URLLC DL control channel may also be based at least in part on ULL or HRLLC sTTI indices, or NR URLLC mini-slot indices, or symbol indices (as is the case for an LTE PUCCH format 2, 2a, 2b, 3, 4, or 5 transmission).

In LTE, a UE-specific DL sequence $r_n(m)$ for DL DMRS, for $p \in \{7, 8, \ldots, 14\}$, may be given as:

$$r(m) = \frac{1}{\sqrt{2}}(1 - 2 \cdot c(2m)) + j \cdot \frac{1}{\sqrt{2}}(1 - 2 \cdot c(2m+1)),$$

$$m = 0, 1, \ldots, 12 N_{RB}^{max,DL} - 1.$$

with the scrambling sequence generator being initialized at the start of each subframe according to:

$$c_{init} = \left(\left\lfloor \frac{n_s}{2} \right\rfloor + 1\right) \cdot (2 \cdot N_{ID}^{cell} + 1) \cdot 2^{16} + n_{SCID}.$$

Depending on the symbol index of a symbol in which the DL DMRS is transmitted in an LTE system (i.e., 5, 6, 12, 13) and $v_{shift}$, a subset of scrambling sequence elements may be used.

In a ULL, HRLLC, or URLLC system, each sTTI of a ULL or HRLLC system may include a DMRS, or each mini-slot of a NR URLLC system may contain a DMRS. Instead of reusing the DL DMRS sequences used for symbol indices 5 and 6 or 12 and 13 for other sTTIs/mini-slots, a DL DMRS sequence may be generated as a function of a sTTI or mini-slot index. Alternatively, the scrambling sequence may depend on each symbol index. For example, a scrambling sequence generator for ULL, HRLLC, or URLLC DL data channels may be initialized based at least in part on a product of symbol/sTTI/mini-slot index (e.g., one of these) and $N_{ID}^{cell}$. Furthermore, the scrambling sequence may depend on whether it is used for an initial DL transmission or a DL retransmission (assuming that the control decoding for the DL transmissions does not rely on the existence of the same DL DMRS in each DL transmission/retransmission). Hence, when an initial DL transmission and DL retransmission (or any two DL retransmissions) are made within sTTIs/mini-slots/symbols having the same index, the interference for the DL DMRS associated with the two DL transmissions will likely be different. However, when the scrambling sequence for DL DMRS depends on whether a DL transmission is an initial transmission or a particular retransmission, a UE may have to test multiple hypotheses (e.g., one for each DL transmission/retransmission) for the scrambling sequence used to receive a DL transmission.

In an LTE UL, and when enabled by higher layers, the group hopping u and sequence hopping v may be a function of a slot index within a frame. The cyclic shift $\alpha_\lambda$ in a slot $n_s$ is given as $\alpha_\lambda = 2\pi_{cs,\lambda}/12$, where:

$$n_{cs,\lambda} = (n_{DMRS}^{(1)} + n_{DMRS}^{(2)} + n_{PN}(n_s)) \bmod 12.$$

$n_{DMRS}^{(1)}$ given by higher layers and $n_{DMRS}^{(2)}$ is given by the CS for UL DMRS field in the UL DCI.

In the UL of a ULL, HRLLC, or URLLC system, the sequence-group number u and sequence number v may be determined as a function of a ULL or HRLLC sTTI index, a NR URLLC mini-slot index, or a UL DMRS symbol index within a subframe or NR slot. Also or alternatively, the UL DMRS cyclic shift for a ULL, HRLLC, or URLLC DL system may depend at least in part on a ULL or HRLLC sTTI index, a NR URLLC mini-slot index, or a UL DMRS symbol index within a subframe or NR slot. Furthermore, one or more of the sequence-group number, sequence number, or UL DMRS cyclic shift may depend on whether it is used for an initial UL transmission or a UL retransmission. Hence, when an initial UL transmission and UL retransmission (or any two UL retransmissions) are made within sTTIs/mini-slots/symbols having the same index, the interference for the UL DMRS associated with the two UL transmissions will likely be different.

Figure 3:
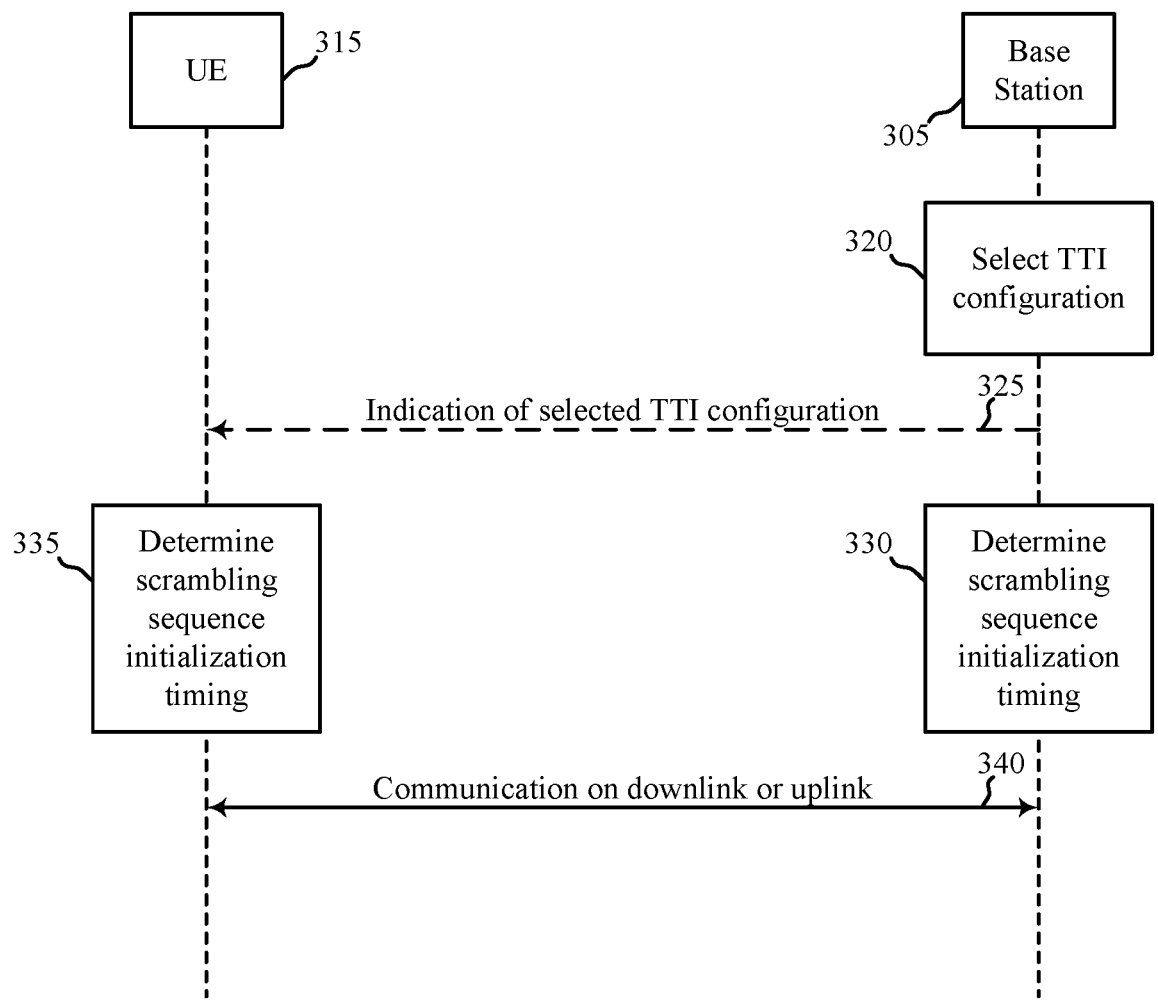
FIG. 3 shows an example message flow between a base station and a UE, in accordance with various aspects of the present disclosure.

FIG. 3 shows an example message flow 300 between a base station 305 and a UE 315, in accordance with various aspects of the present disclosure. The base station 305 and UE 315 may be examples of aspects of the base stations and UEs described with reference to FIG. 1.

At 320, the base station 305 may select a TTI configuration for communicating with the UE 315 on a downlink or an uplink. The TTI configuration may be one TTI configuration in a plurality of available TTI configurations for communicating with the UE 315. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

At 325, the base station 305 may optionally transmit an indication of the selected TTI configuration to the UE 315. In other examples, the indication of the selected TTI configuration may be transmitted to the UE 315 in conjunction with the communication(s) at 340. In some examples, the selected TTI configuration may be indicated in system information (SI; e.g., in a master information block (MIB), in a system information block (SIB), or in minimum SI). In other examples, the selected TTI configuration may be indicated in radio resource control (RRC) signaling for the UE 315 (or for a group of UEs including the UE 315). The TTI configuration may be variously indicated by a TTI duration, a symbol period duration or configuration, a tone spacing, etc.).

At 330 and 335, the base station 305 and UE 35 may each determine a scrambling sequence initialization timing based at least in part on a TTI numerology associated with the selected TTI configuration. In some examples, the TTI numerology may include a shortened TTI index, a mini-slot index, or a symbol index. When the selected TTI configuration is a TTI configuration based at least in part on a shortened TTI, and in some examples, the TTI numerology may be identified as a shortened TTI index or symbol index. When the selected TTI configuration is a TTI configuration based at least in part on a mini-slot, and in some examples, the TTI numerology may be identified as a mini-slot index or symbol index.

At 340, the base station 305 and UE 315 may communicate on the downlink or the uplink according to a scrambling sequence initialized based at least in part on the determined scrambling sequence initialization timing. In some examples, the communicating may include scrambling and transmitting a downlink transmission (e.g., a downlink data channel, a downlink control channel, or a downlink DMRS) according to the scrambling sequence. In some examples, the communicating may include receiving an uplink transmission (e.g., an uplink data channel, an uplink control channel, or an uplink DMRS) that is scrambled according to the scrambling sequence, and descrambling the uplink transmission.

Figure 4:
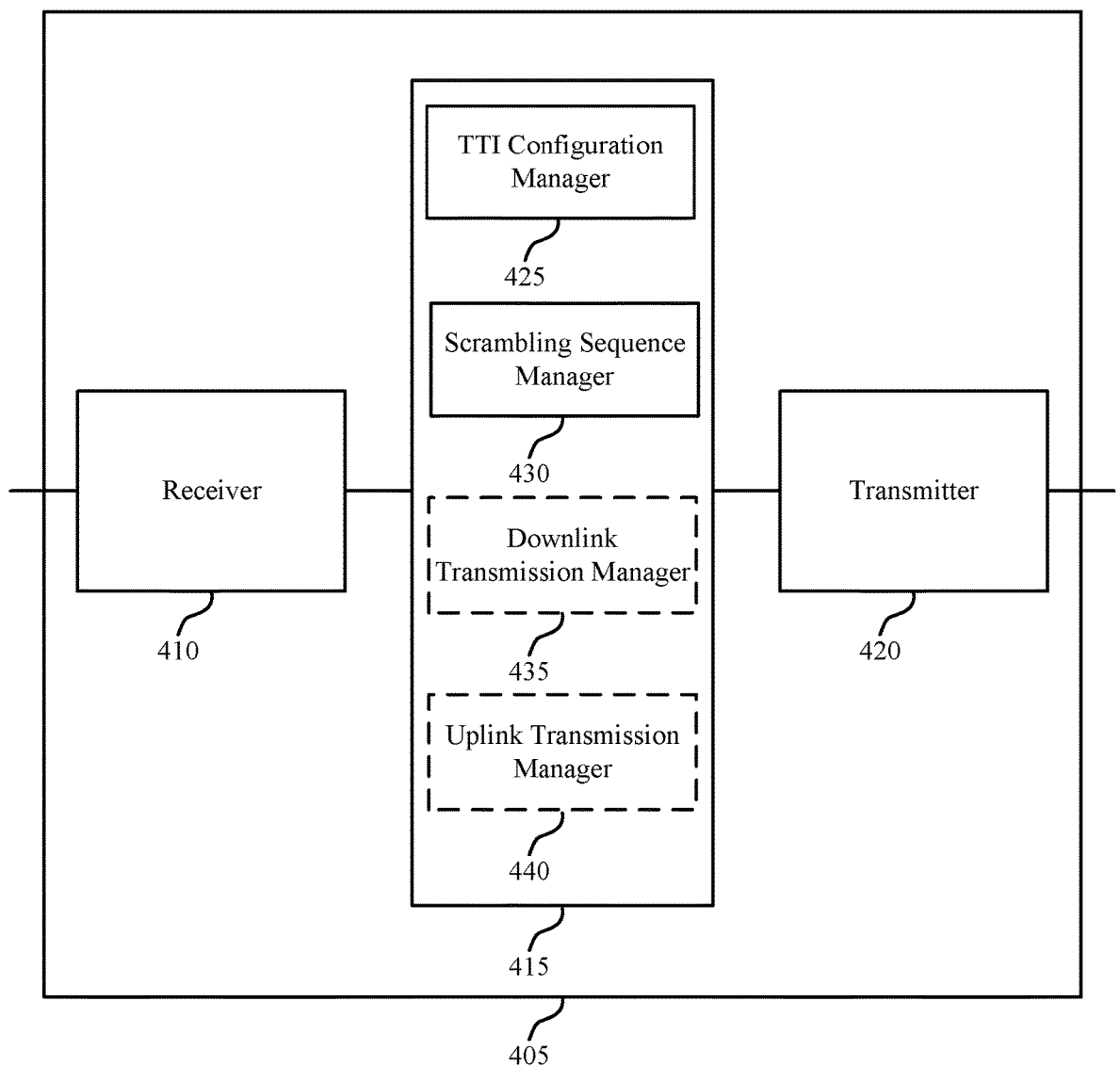
FIG. 4 shows a block diagram of an apparatus for use in wireless communication, in accordance with various aspects of the present disclosure.

FIG. 4 shows a block diagram 400 of an apparatus 405 for use in wireless communication, in accordance with various aspects of the present disclosure. The apparatus 405 may be an example of aspects of one or more of the UEs described with reference to FIGS. 1 and 3. The apparatus 405 may include a receiver 410, a wireless communication manager 415, and a transmitter 420. The apparatus 405 may also include a processor. Each of these components may be in communication with one another (e.g., via one or more buses).

The receiver 410 may receive data or control signals or information (i.e., transmissions), some or all of which may be associated with various information channels (e.g., data channels, control channels, etc.). Received signals or information, or measurements performed thereon, may be passed to other components of the apparatus 405.

The transmitter 420 may transmit data or control signals or information (i.e., transmissions) generated by other components of the apparatus 405, some or all of which may be associated with various information channels (e.g., data channels, control channels, etc.). In some examples, the transmitter 420 may be collocated with the receiver 410 in a transceiver. For example, the transmitter 420 and receiver 410 may be an example of aspects of the transceiver(s) 830 described with reference to FIG. 4.

The wireless communication manager 415 and/or at least some of its various sub-components may be implemented in hardware, software executed by a processor, firmware, or any combination thereof. If implemented in software executed by a processor, the functions of the wireless communication manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 415 and/or at least some of its various sub-components may be physically located at various positions, including being distributed such that portions of functions are implemented at different physical locations by one or more physical devices. In some examples, the wireless communication manager 415 and/or at least some of its various sub-components may be a separate and distinct component in accordance with various aspects of the present disclosure. In other examples, the wireless communication manager 415 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 415 may include a TTI configuration manager 425, a scrambling sequence manager 430, an optional downlink transmission manager 435, and/or an optional uplink transmission manager 440.

The TTI configuration manager 425 may be used to receive an indication of a TTI configuration, as described for example with reference to FIGS. 2 and 3. The TTI configuration may be one TTI configuration in a plurality of available TTI configurations for communicating with a base station. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

The scrambling sequence manager 430 may be used to determine a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the TTI configuration is identified as a TTI configuration based at least in part on a shortened TTI, and in some examples, the TTI numerology may be identified as a shortened TTI index or symbol index. When the TTI configuration is identified as a TTI configuration based at least in part on a mini-slot, and in some examples, the TTI numerology may be identified as a mini-slot index or symbol index.

The downlink transmission manager 435 and/or uplink transmission manager 440 may be used to communicate with the base station on a downlink or an uplink according to a scrambling sequence initialized based at least in part on the determined scrambling sequence initialization timing, as described for example with reference to FIGS. 2 and 3. In some examples, the downlink transmission manager 435 may be used to receive a downlink transmission that is scrambled according to the scrambling sequence, and descramble the downlink transmission. In some examples, the uplink transmission manager 440 may be used to scramble and transmit an uplink transmission according to the scrambling sequence.

Figure 5:
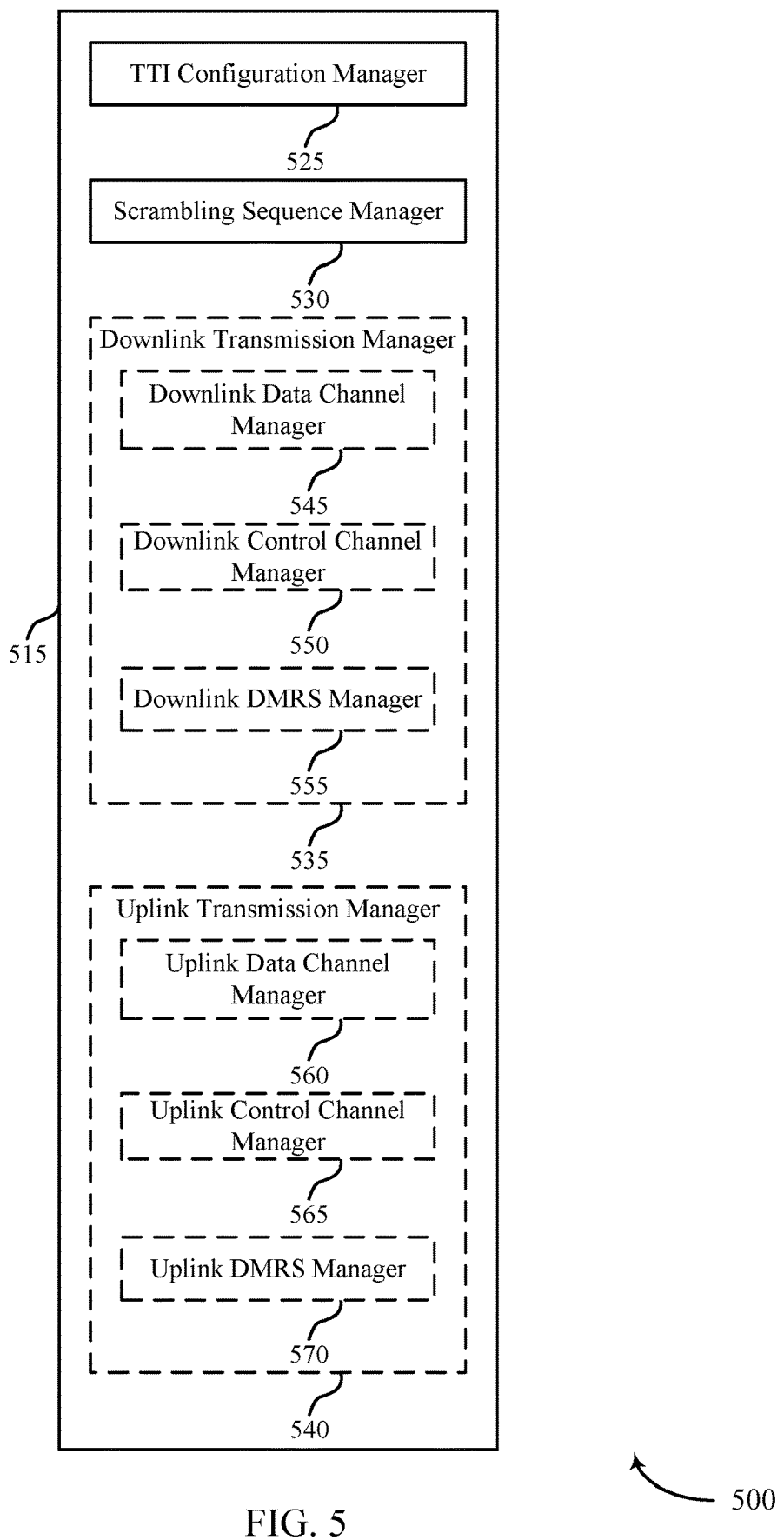
FIG. 5 shows a block diagram of a wireless communication manager, in accordance with various aspects of the present disclosure.

FIG. 5 shows a block diagram 900 of a wireless communication manager 515, in accordance with various aspects of the present disclosure. The wireless communication manager 515 may be an example of aspects of the wireless communication manager described with reference to FIG. 4. The wireless communication manager 515 may include a TTI configuration manager 525, a scrambling sequence manager 530, an optional downlink transmission manager 535, and/or an optional uplink transmission manager 540. The downlink transmission manager 535 may include an optional downlink data channel manager 545, an optional downlink control channel manager 550, and/or an optional downlink DMRS manager 555. The uplink transmission manager 540 may include an optional uplink data channel manager 560, an optional uplink control channel manager 565, and/or an optional uplink DMRS manager 570. Each of these components may communicate, directly or indirectly, with one another (e.g., via one or more buses). The TTI configuration manager 525, scrambling sequence manager 530, downlink transmission manager 535, and uplink transmission manager 540 may be examples of the TTI configuration manager 425, scrambling sequence manager 430, downlink transmission manager 435, and uplink transmission manager 440 described with reference to FIG. 4.

The TTI configuration manager 525 may be used to receive an indication of a TTI configuration, as described for example with reference to FIGS. 2 and 3. The TTI configuration may be one TTI configuration in a plurality of available TTI configurations for communicating with a base station. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

The scrambling sequence manager 530 may be used to determine a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the TTI configuration is identified as a TTI configuration based at least in part on a shortened TTI, and in some examples, the TTI numerology may be identified as a shortened TTI index or symbol index. When the TTI configuration is identified as a TTI configuration based at least in part on a mini-slot, and in some examples, the TTI numerology may be identified as a mini-slot index or symbol index.

The scrambling sequence manager 530 may also be used to initialize the scrambling sequence based at least in part on a shortened TTI index, a mini-slot index, or a symbol index, at each shortened TTI boundary, mini-slot boundary, or symbol boundary. In some examples, the scrambling sequence may also or alternatively be initialized based at least in part on whether a transmission to be descrambled or scrambled is associated with an initial transmission or with a particular retransmission in a set of one or more retransmissions. The scrambling sequence may be initialized in association with communications managed by the downlink transmission manager 535 or uplink transmission manager 540.

The downlink transmission manager 535 and/or uplink transmission manager 540 may be used to communicate with the base station on a downlink or an uplink according to a scrambling sequence initialized based at least in part on the determined scrambling sequence initialization timing, as described for example with reference to FIGS. 2 and 3. In some examples, the downlink transmission manager 535 may be used to receive a downlink transmission that is scrambled according to the scrambling sequence, and descramble the downlink transmission. In some examples, the uplink transmission manager 540 may be used to scramble and transmit an uplink transmission according to the scrambling sequence.

In some examples, the scrambling sequence initialization timing may be associated with a downlink data channel, and the downlink data channel manager 545 may be used to communicate according to the scrambling sequence by descrambling the downlink data channel based at least in part on the scrambling sequence. In some of these examples, the scrambling sequence manager 530 may be used to initialize the scrambling sequence based at least in part on whether the downlink data channel is associated with an initial transmission or with a particular retransmission in a set of one or more retransmissions.

In some examples, the scrambling sequence initialization timing may be associated with a downlink control channel, and the downlink control channel manager 550 may be used to communicate according to the scrambling sequence by descrambling the downlink control channel based at least in part on the scrambling sequence. In some of these examples, the scrambling sequence manager 530 may be used to initialize the scrambling sequence based at least in part on whether the downlink control channel is associated with an initial transmission or with a particular retransmission in a set of one or more retransmissions. In some examples, the downlink control channel manager 550 may be used to identify at least one cyclic shift associated with the downlink control channel. A cyclic shift may be identified based at least in part on a shortened TTI index, a mini-slot index, or a symbol index, at each shortened TTI boundary, mini-slot boundary, or symbol boundary.

In some examples, the scrambling sequence initialization timing may be associated with a downlink DMRS, and the downlink DMRS manager 555 may be used to communicate according to the scrambling sequence by descrambling the downlink DMRS based at least in part on the scrambling sequence. In some of these examples, the scrambling sequence manager 530 may be used to initialize the scrambling sequence based at least in part on whether the downlink DMRS is associated with an initial transmission or with a particular retransmission in a set of one or more retransmissions.

In some examples, the scrambling sequence initialization timing may be associated with an uplink data channel, and the uplink data channel manager 560 may be used to communicate according to the scrambling sequence by scrambling the uplink data channel based at least in part on the scrambling sequence. In some of these examples, the scrambling sequence manager 530 may be used to initialize the scrambling sequence based at least in part on whether the uplink data channel is associated with an initial transmission or with a particular retransmission in a set of one or more retransmissions.

In some examples, the scrambling sequence initialization timing may be associated with an uplink control channel, and the uplink control channel manager 565 may be used to communicate according to the scrambling sequence by scrambling the uplink control channel based at least in part on the scrambling sequence.

In some examples, the scrambling sequence initialization timing may be associated with an uplink DMRS, and the uplink DMRS manager 570 may be used to communicate according to the scrambling sequence by determining a hopping sequence of the uplink DMRS based at least in part on the scrambling sequence. In some of these examples, the scrambling sequence manager 530 may be used to initialize the scrambling sequence based at least in part on whether the uplink DMRS is associated with an initial transmission or with a particular retransmission in a set of one or more retransmissions. In some examples, the scrambling sequence may be initialized by initializing at least one of a sequence-group number on which the hopping sequence is based, a sequence number on which the hopping sequence is based, or a combination thereof. In some examples, the uplink DMRS manager 570 may be used to cyclically shift the uplink DMRS based at least in part on a shortened TTI index, a mini-slot index, or a symbol index. The cyclic shift may be updated at each shortened TTI boundary, mini-slot boundary, or symbol boundary.

Figure 6:
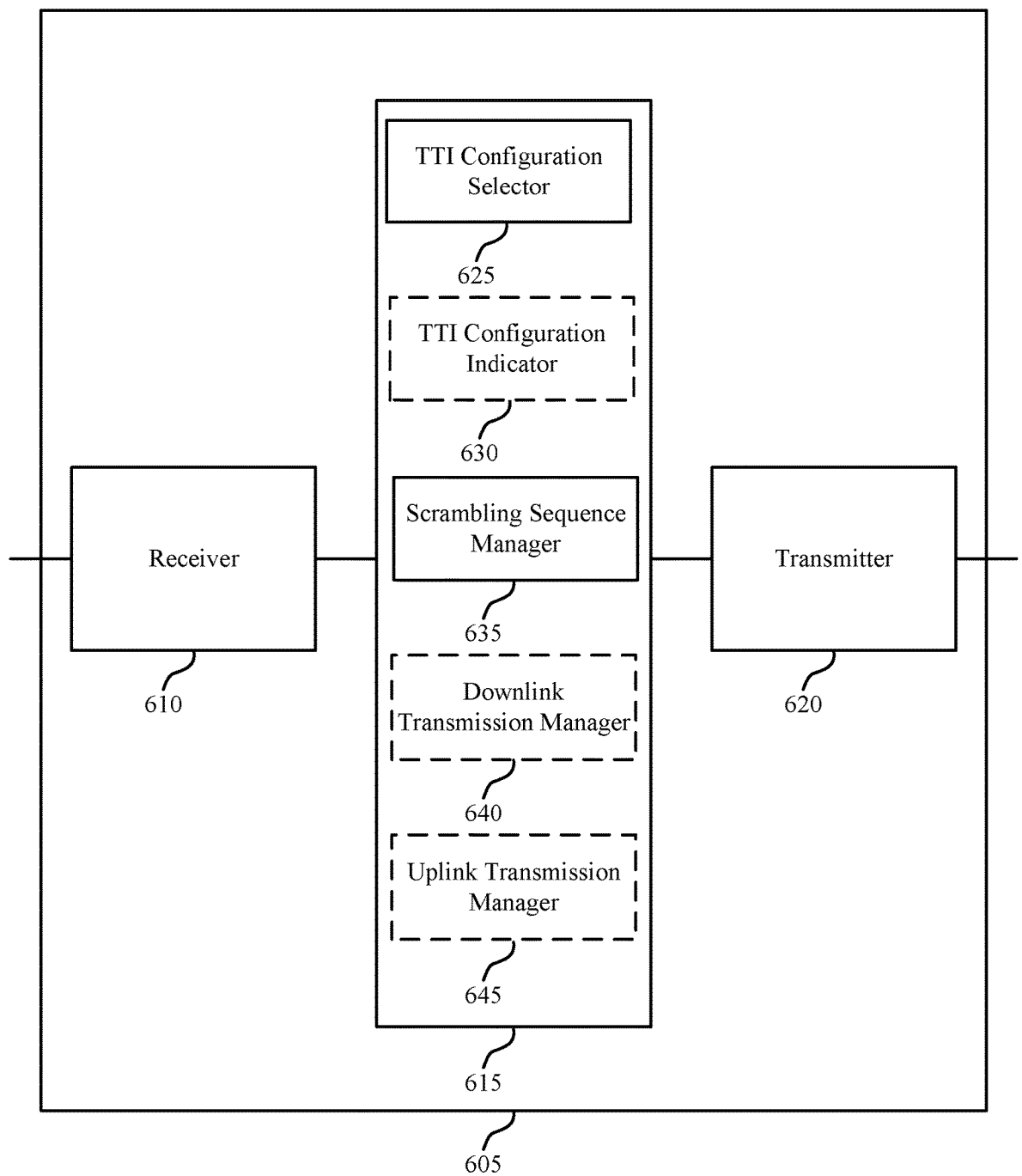
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations described with reference to FIGS. 1-3 and 5-7. The apparatus 605 may include a receiver 610, a wireless communication manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). Received signals or information, or measurements performed thereon, may be passed to other components of the apparatus 605.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver(s) 950 described with reference to FIG. 9.

The wireless communication manager 615 and/or at least some of its various sub-components may be implemented in hardware, software executed by a processor, firmware, or any combination thereof. If implemented in software executed by a processor, the functions of the wireless communication manager 615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 615 and/or at least some of its various sub-components may be physically located at various positions, including being distributed such that portions of functions are implemented at different physical locations by one or more physical devices. In some examples, the wireless communication manager 615 and/or at least some of its various sub-components may be a separate and distinct component in accordance with various aspects of the present disclosure. In other examples, the wireless communication manager 615 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 615 may include a TTI configuration selector 625, an optional TTI configuration indicator 630, a scrambling sequence manager 635, an optional downlink transmission manager 640, and/or an optional uplink transmission manager 645.

The TTI configuration selector 625 may be used to select a TTI configuration for communicating with a UE on a downlink or an uplink, as described for example with reference to FIGS. 2 and 3. The TTI configuration may be one TTI configuration in a plurality of available TTI configurations for communicating with the UE. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

The TTI configuration indicator 630 may be used to transmit an indication of the selected TTI configuration to the UE, as described with reference to FIGS. 2 and 3. In some examples of the method, the indication of the selected TTI configuration may be transmitted to the UE in conjunction with the communication(s) managed by the downlink transmission manager 640 or the uplink transmission manager 645.

The scrambling sequence manager 635 may be used to determine a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the selected TTI configuration is a TTI configuration based at least in part on a shortened TTI, and in some examples, the TTI numerology may be identified as a shortened TTI index or symbol index. When the selected TTI configuration is a TTI configuration based at least in part on a mini-slot, and in some examples, the TTI numerology may be identified as a mini-slot index or symbol index.

The downlink transmission manager 640 and/or uplink transmission manager 645 may be used to communicate with the UE on the downlink or the uplink according to a scrambling sequence initialized based at least in part on the determined scrambling sequence initialization timing, as described for example with reference to FIGS. 2 and 3. In some examples, the downlink transmission manager 640 may be used to scramble and transmit a downlink transmission according to the scrambling sequence. In some examples, the uplink transmission manager 645 may be used to receive an uplink transmission that is scrambled according to the scrambling sequence, and descramble the uplink transmission.

Figure 7:
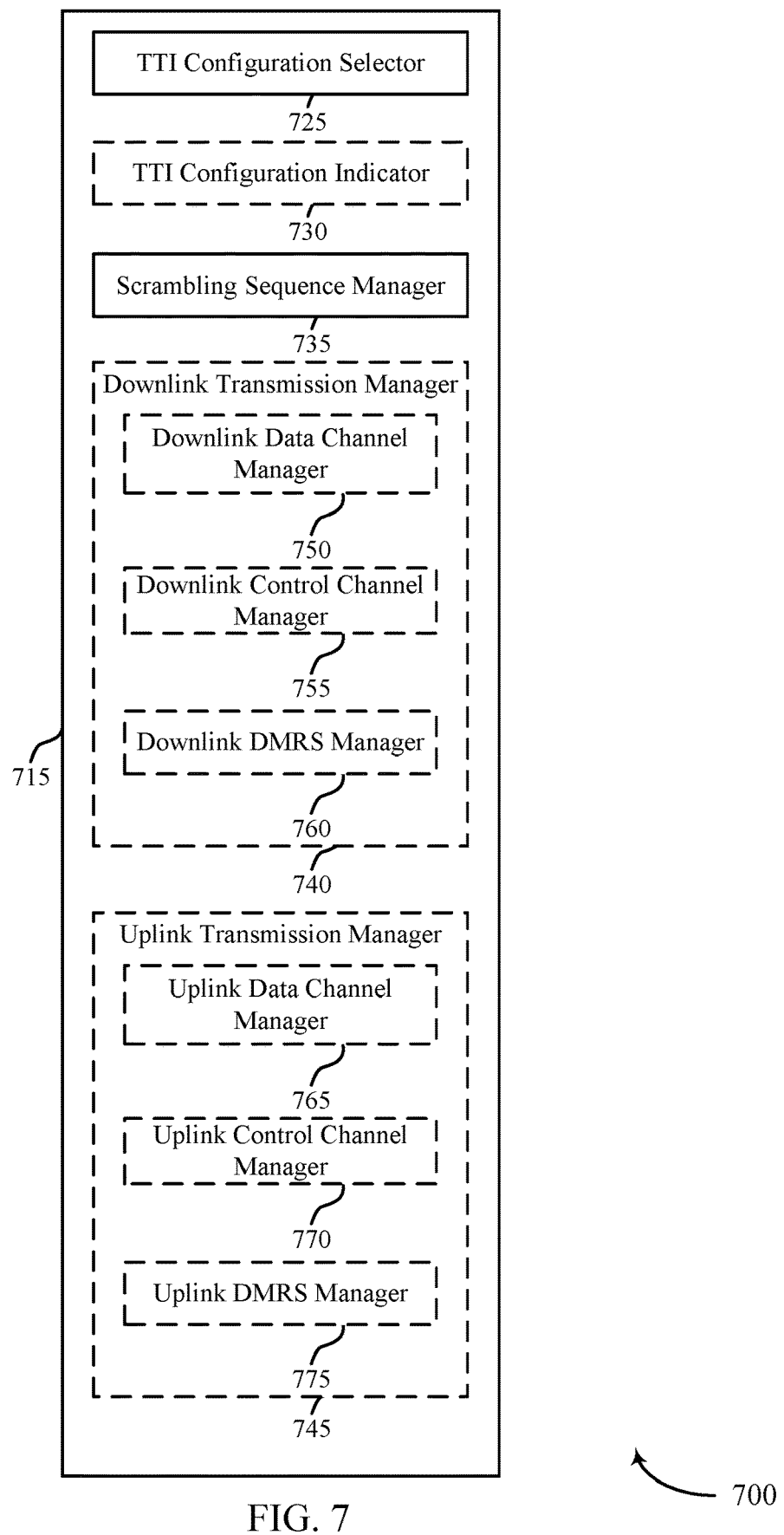
FIG. 7 shows a block diagram of a wireless communication manager, in accordance with various aspects of the present disclosure.

FIG. 7 shows a block diagram 700 of a wireless communication manager 715, in accordance with various aspects of the present disclosure. The wireless communication manager 715 may be an example of aspects of the wireless communication manager described with reference to FIG. 6. The wireless communication manager 715 may include a TTI configuration selector 725, an optional TTI configuration indicator 730, a scrambling sequence manager 735, an optional downlink transmission manager 740, and/or an optional uplink transmission manager 745. The downlink transmission manager 740 may include an optional downlink data channel manager 750, an optional downlink control channel manager 755, and/or an optional downlink DMRS manager 760. The uplink transmission manager 745 may include an optional uplink data channel manager 765, an optional uplink control channel manager 770, and/or an optional uplink DMRS manager 775. Each of these components may communicate, directly or indirectly, with one another (e.g., via one or more buses). The a TTI configuration selector 725, TTI configuration indicator 730, scrambling sequence manager 735, downlink transmission manager 740, and uplink transmission manager 745 may be examples of the TTI configuration selector 625, TTI configuration indicator 630, scrambling sequence manager 635, downlink transmission manager 640, and uplink transmission manager 645 described with reference to FIG. 6.

The TTI configuration selector 725 may be used to select a TTI configuration for communicating with a UE on a downlink or an uplink, as described for example with reference to FIGS. 2 and 3. The TTI configuration may be one TTI configuration in a plurality of available TTI configurations for communicating with the UE. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof.

The TTI configuration indicator 730 may be used to transmit an indication of the selected TTI configuration to the UE, as described with reference to FIGS. 2 and 3. In some examples of the method, the indication of the selected TTI configuration may be transmitted to the UE in conjunction with the communication(s) managed by the downlink transmission manager 740 or the uplink transmission manager 745.

The scrambling sequence manager 735 may be used to determine a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the selected TTI configuration is a TTI configuration based at least in part on a shortened TTI, and in some examples, the TTI numerology may be identified as a shortened TTI index or symbol index. When the selected TTI configuration is a TTI configuration based at least in part on a mini-slot, and in some examples, the TTI numerology may be identified as a mini-slot index or symbol index.

The scrambling sequence manager 735 may also be used to initialize the scrambling sequence based at least in part on a shortened TTI index, a mini-slot index, or a symbol index, at each shortened TTI boundary, mini-slot boundary, or symbol boundary. In some examples, the scrambling sequence may also or alternatively be initialized based at least in part on whether a transmission to be scrambled or descrambled is associated with an initial transmission or with a particular retransmission in a set of one or more retransmissions. The scrambling sequence may be initialized in association with communications managed by the downlink transmission manager 740 or uplink transmission manager 745.

The downlink transmission manager 740 and/or uplink transmission manager 745 may be used to communicate with the UE on the downlink or the uplink according to a scrambling sequence initialized based at least in part on the determined scrambling sequence initialization timing, as described for example with reference to FIGS. 2 and 3. In some examples, the downlink transmission manager 740 may be used to scramble and transmit a downlink transmission according to the scrambling sequence. In some examples, the uplink transmission manager 745 may be used to receive an uplink transmission that is scrambled according to the scrambling sequence, and descramble the uplink transmission.

In some examples, the scrambling sequence initialization timing may be associated with a downlink data channel, and the downlink data channel manager 750 may be used to communicate according to the scrambling sequence by scrambling the downlink data channel based at least in part on the scrambling sequence. In some of these examples, the scrambling sequence manager 735 may be used to initialize the scrambling sequence based at least in part on whether the downlink data channel is associated with an initial transmission or with a particular retransmission in a set of one or more retransmissions.

In some examples, the scrambling sequence initialization timing may be associated with a downlink control channel, and the downlink control channel manager 755 may be used to communicate according to the scrambling sequence by scrambling the downlink control channel based at least in part on the scrambling sequence. In some of these examples, the scrambling sequence manager 735 may be used to initialize the scrambling sequence based at least in part on whether the downlink control channel is associated with an initial transmission or with a particular retransmission in a set of one or more retransmissions. In some examples, the downlink control channel manager 755 may be used to cyclically shift the downlink control channel. A cyclic shift may be updated based at least in part on a shortened TTI index, a mini-slot index, or a symbol index, at each shortened TTI boundary, mini-slot boundary, or symbol boundary.

In some examples, the scrambling sequence initialization timing may be associated with a downlink DMRS, and the downlink DMRS manager 760 may be used to communicate according to the scrambling sequence by scrambling the downlink DMRS based at least in part on the scrambling sequence. In some of these examples, the scrambling sequence manager 735 may be used to initialize the scrambling sequence based at least in part on whether the downlink DMRS is associated with an initial transmission or with a particular retransmission in a set of one or more retransmissions.

In some examples, the scrambling sequence initialization timing may be associated with an uplink data channel, and the uplink data channel manager 765 may be used to communicate according to the descrambling sequence by scrambling the uplink data channel based at least in part on the scrambling sequence. In some of these examples, the scrambling sequence manager 735 may be used to initialize the scrambling sequence based at least in part on whether the uplink data channel is associated with an initial transmission or with a particular retransmission in a set of one or more retransmissions.

In some examples, the scrambling sequence initialization timing may be associated with an uplink control channel, and the uplink control channel manager 770 may be used to communicate according to the descrambling sequence by scrambling the uplink control channel based at least in part on the scrambling sequence.

In some examples, the scrambling sequence initialization timing may be associated with an uplink DMRS, and the uplink DMRS manager 775 may be used to communicate according to the scrambling sequence by determining a hopping sequence of the uplink DMRS based at least in part on the scrambling sequence. In some of these examples, the scrambling sequence manager 735 may be used to initialize the scrambling sequence based at least in part on whether the uplink DMRS is associated with an initial transmission or with a particular retransmission in a set of one or more retransmissions. In some examples, the scrambling sequence may be initialized by initializing at least one of a sequence-group number on which the hopping sequence is based, a sequence number on which the hopping sequence is based, or a combination thereof. In some examples, the uplink DMRS manager 775 may be used to identify at least one cyclic shift associated with the uplink DMRS based at least in part on a shortened TTI index, a mini-slot index, or a symbol index. The cyclic shift may be identified at each shortened TTI boundary, mini-slot boundary, or symbol boundary.

Figure 8:
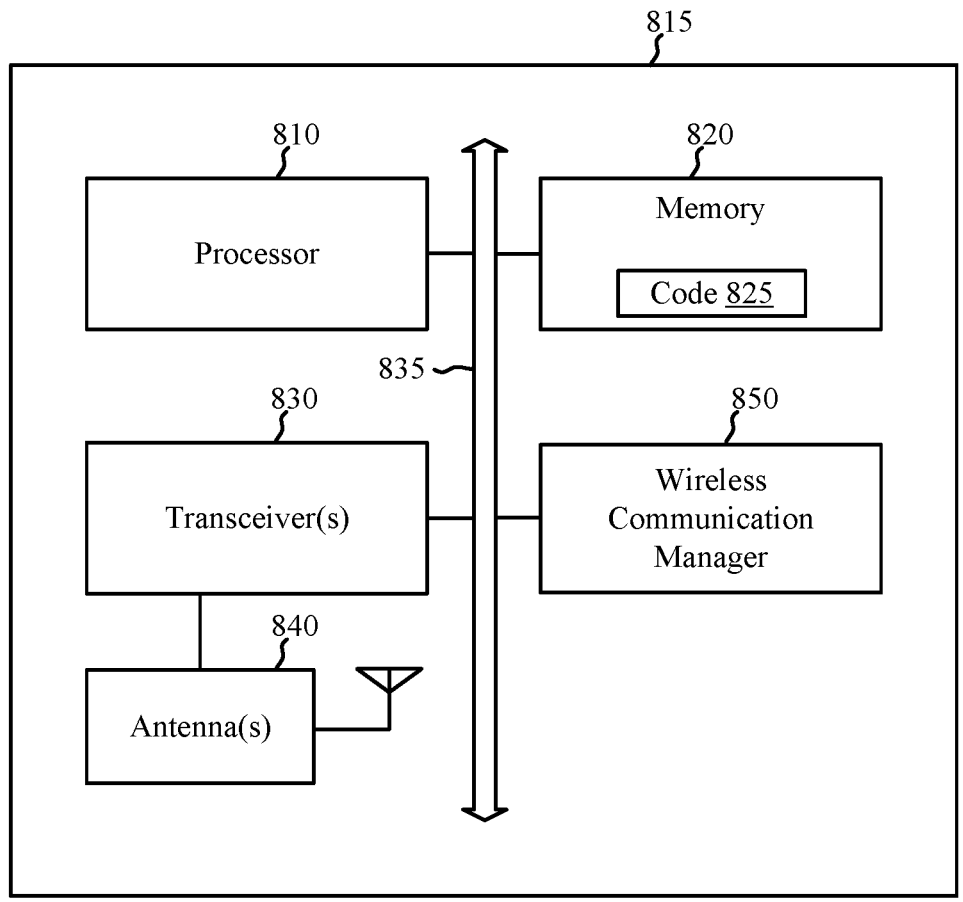
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 815 may, in some examples, have an internal power supply (not shown), such as a small battery, to facilitate mobile operation. In some examples, the UE 815 may be an example of aspects of one or more of the UEs described with reference to FIGS. 1 and 3, or aspects of the apparatus described with reference to FIG. 4. The UE 815 may be configured to implement at least some of the UE or apparatus techniques or functions described with reference to FIGS. 1-5.

The UE 815 may include a processor 810, a memory 820, at least one transceiver (represented by transceiver(s) 830), antennas 840 (e.g., an antenna array), or a wireless communication manager 850. Each of these components may be in communication with each other, directly or indirectly, over one or more buses 835.

The memory 820 may include random access memory (RAM) or read-only memory (ROM). The memory 820 may store computer-readable, computer-executable code 825 containing instructions that are configured to, when executed, cause the processor 810 to perform various functions described herein related to wireless communication, including, for example, determining a scrambling sequence initialization timing based at least in part on a TTI numerology associated with a received TTI configuration. Alternatively, the computer-executable code 825 may not be directly executable by the processor 810 but be configured to cause the UE 815 (e.g., when compiled and executed) to perform various of the functions described herein.

The processor 810 may include an intelligent hardware device, e.g., a central processing unit (CPU), a microcontroller, an ASIC, etc. The processor 810 may process information received through the transceiver(s) 830 or information to be sent to the transceiver(s) 830 for transmission through the antennas 840. The processor 810 may handle, alone or in connection with the wireless communication manager 850, one or more aspects of communicating over (or managing communications over) one or more radio frequency spectrum bands.

The transceiver(s) 830 may include a modem configured to modulate packets and provide the modulated packets to the antennas 840 for transmission, and to demodulate packets received from the antennas 840. The transceiver(s) 830 may, in some examples, be implemented as one or more transmitters and one or more separate receivers. The transceiver(s) 830 may support communications in one or more radio frequency spectrum bands. The transceiver(s) 830 may be configured to communicate bi-directionally, via the antennas 840, with one or more base stations or apparatuses, such as one or more of the base stations or apparatuses described with reference to FIGS. 1, 3, and 6.

The wireless communication manager 850 may be configured to perform or control some or all of the UE or apparatus techniques or functions described with reference to FIGS. 1-5. The wireless communication manager 850, or portions of it, may include a processor, or some or all of the functions of the wireless communication manager 850 may be performed by the processor 810 or in connection with the processor 810. In some examples, the wireless communication manager 850 may be an example of aspects of one or more of the wireless communication managers described with reference to FIGS. 4 and 5.

Figure 9:
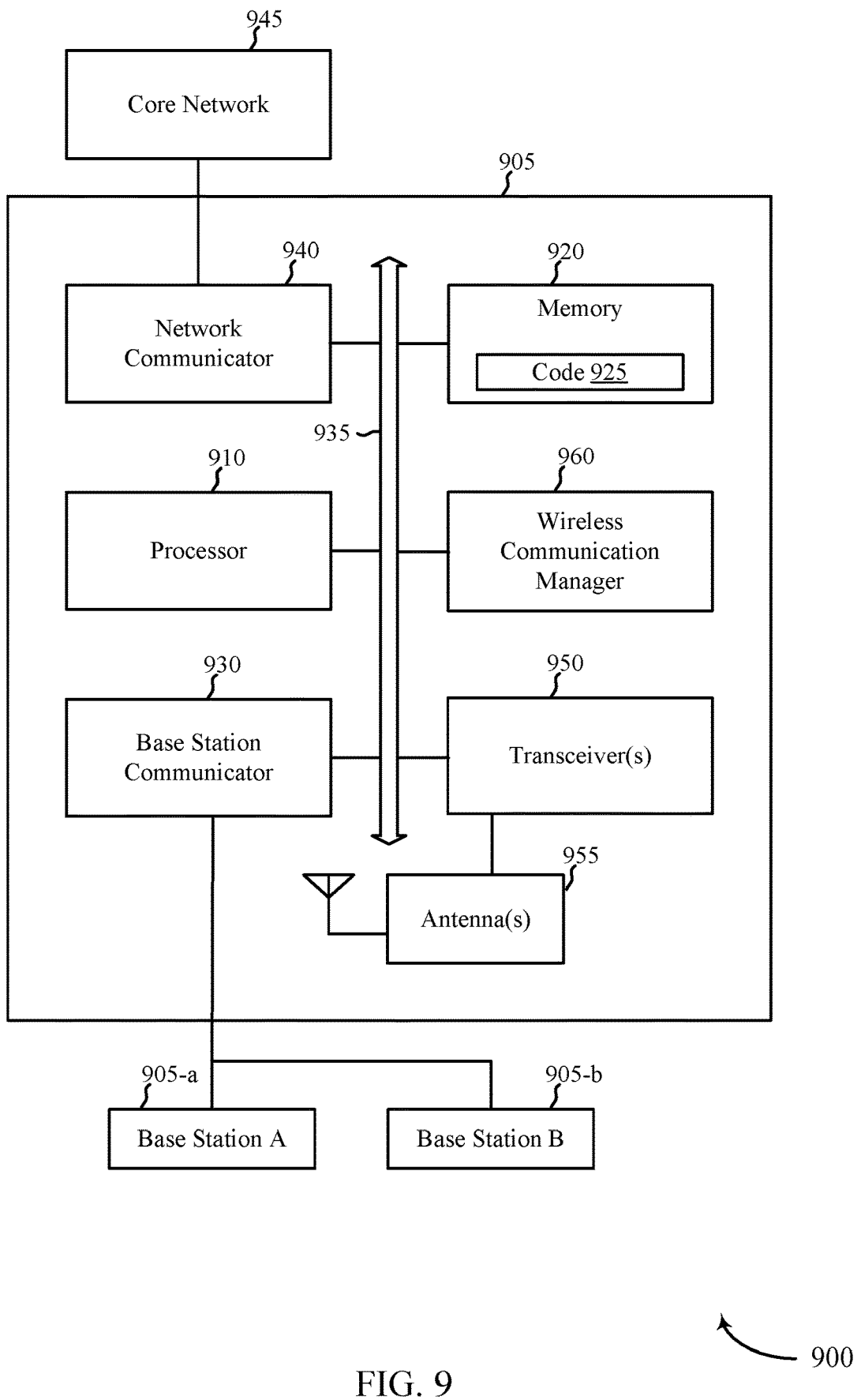
FIG. 9 shows a block diagram of a base station for use in wireless communication, in accordance with various aspects of the present disclosure.

FIG. 9 shows a block diagram 900 of a base station 905 for use in wireless communication, in accordance with various aspects of the present disclosure. In some examples, the base station 905 may be an example of one or more aspects of the base stations described with reference to FIGS. 1 and 3, or aspects of the apparatus described with reference to FIG. 6. The base station 905 may be configured to implement or facilitate at least some of the base station or apparatus techniques or functions described with reference to FIGS. 1-3, 6, and 7.

The base station 905 may include a processor 910, a memory 920, at least one transceiver (represented by transceiver(s) 950), at least one antenna 955 (e.g., an antenna array), or a wireless communication manager 960. The base station 905 may also include one or more of a base station communicator 930 or a network communicator 940. Each of these components may be in communication with each other, directly or indirectly, over one or more buses 935.

The memory 920 may include RAM or ROM. The memory 920 may store computer-readable, computer-executable code 925 containing instructions that are configured to, when executed, cause the processor 910 to perform various functions described herein related to wireless communication, including, for example, determining a scrambling sequence initialization timing based at least in part on a TTI numerology associated with a selected TTI configuration. Alternatively, the computer-executable code 925 may not be directly executable by the processor 910 but be configured to cause the base station 905 (e.g., when compiled and executed) to perform various of the functions described herein.

The processor 910 may include an intelligent hardware device, e.g., a CPU, a microcontroller, an ASIC, etc. The processor 910 may process information received through the transceiver(s) 950, the base station communicator 930, or the network communicator 940. The processor 910 may also process information to be sent to the transceiver(s) 950 for transmission through the antennas 955, or to the base station communicator 930 for transmission to one or more other base stations (e.g., base station 905-a and base station 905-b), or to the network communicator 940 for transmission to a core network 945, which may be an example of one or more aspects of the core network 130 described with reference to FIG. 1. The processor 910 may handle, alone or in connection with the wireless communication manager 960, one or more aspects of communicating over (or managing communications over) one or more radio frequency spectrum bands.

The transceiver(s) 950 may include a modem configured to modulate packets and provide the modulated packets to the antennas 955 for transmission, and to demodulate packets received from the antennas 955. The transceiver(s) 950 may, in some examples, be implemented as one or more transmitters and one or more separate receivers. The transceiver(s) 950 may support communications in one or more radio frequency spectrum bands. The transceiver(s) 950 may be configured to communicate bi-directionally, via the antennas 955, with one or more UEs or apparatuses, such as one or more of the UEs or apparatus described with reference to FIGS. 1, 3, 4, and 8. The base station 905 may communicate with the core network 945 through the network communicator 940. The base station 905 may also communicate with other base stations, such as the base station 905-a and the base station 905-b, using the base station communicator 930.

The wireless communication manager 960 may be configured to perform or control some or all of the base station or apparatus techniques or functions described with reference to FIGS. 1-3, 6, and 7. The wireless communication manager 960, or portions of it, may include a processor, or some or all of the functions of the wireless communication manager 960 may be performed by the processor 910 or in connection with the processor 910. In some examples, the wireless communication manager 960 may be an example of aspects of one or more of the wireless communication managers described with reference to FIGS. 6 and 7.

Figure 10:
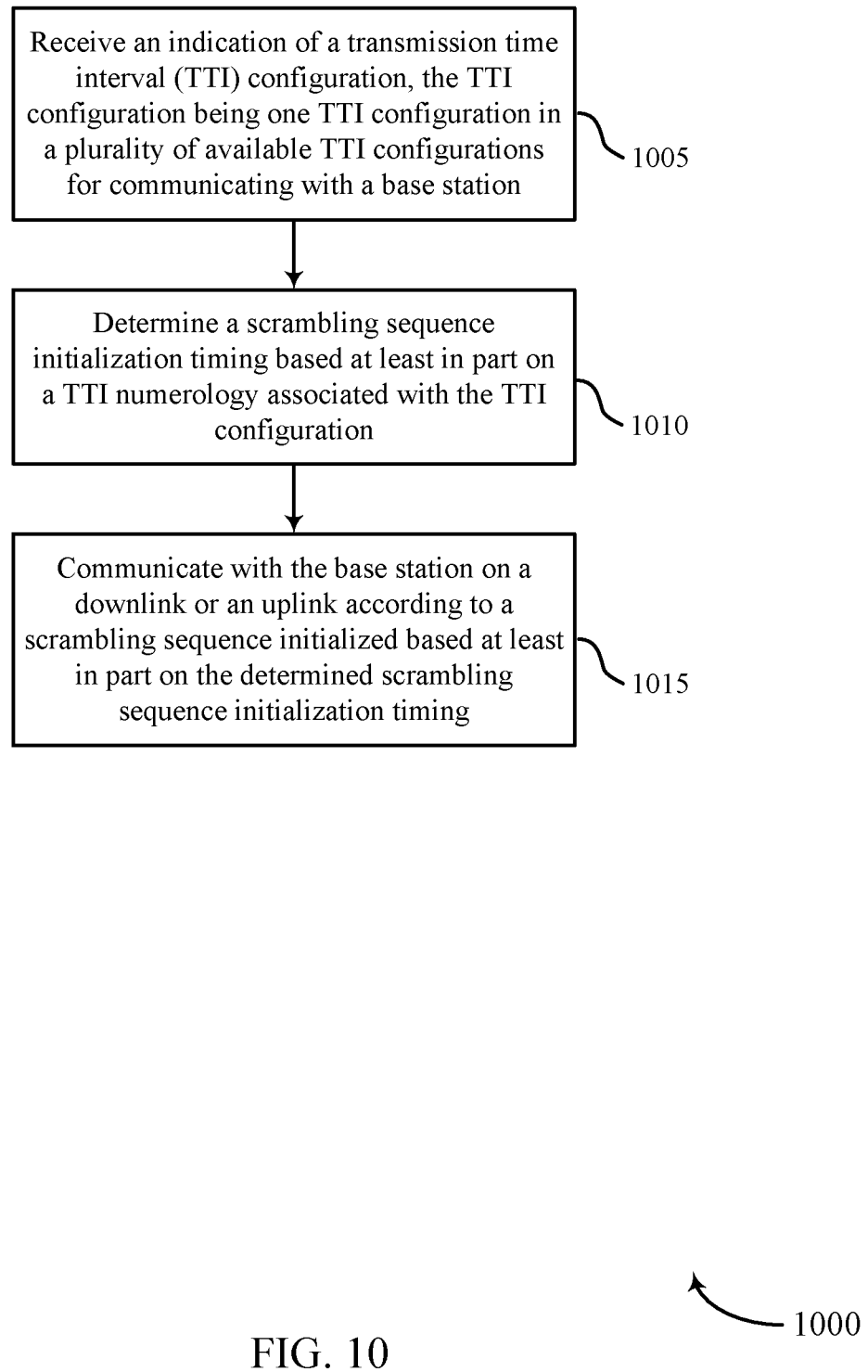
FIG. 10 is a flow chart illustrating an example of a method for wireless communication at a UE, in accordance with various aspects of the present disclosure.

FIG. 10 is a flow chart illustrating an example of a method 1000 for wireless communication at a UE, in accordance with various aspects of the present disclosure. For clarity, the method 1000 is described below with reference to aspects of one or more of the UEs described with reference to FIGS. 1, 3, and 8, aspects of the apparatus described with reference to FIG. 4, or aspects of one or more of the wireless communication managers described with reference to FIGS. 4, 5, and 8. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include receiving an indication of a TTI configuration, as described for example with reference to FIGS. 2 and 3. The TTI configuration may be one TTI configuration in a plurality of available TTI configurations for communicating with a base station. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof. In some examples, the operation(s) at block 1005 may be performed using the TTI configuration manager described with reference to FIGS. 4 and 5.

At block 1010, the method 1000 may include determining a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the TTI configuration is identified as a TTI configuration based at least in part on a shortened TTI, and in some examples, the TTI numerology may be identified as a shortened TTI index or symbol index. When the TTI configuration is identified as a TTI configuration based at least in part on a mini-slot, and in some examples, the TTI numerology may be identified as a mini-slot index or symbol index. In some examples, the operation(s) at block 1010 may be performed using the scrambling sequence manager described with reference to FIGS. 4 and 5.

At block 1015, the method 1000 may include communicating with the base station on a downlink or an uplink according to a scrambling sequence initialized based at least in part on the determined scrambling sequence initialization timing, as described for example with reference to FIGS. 2 and 3. In some examples, the communicating may include receiving a downlink transmission that is scrambled according to the scrambling sequence, and descrambling the downlink transmission. In some examples, the communicating may include scrambling and transmitting an uplink transmission according to the scrambling sequence. In some examples, the operation(s) at block 1015 may be performed using the downlink transmission manager or uplink transmission manager described with reference to FIGS. 4 and 5.

Figure 11:
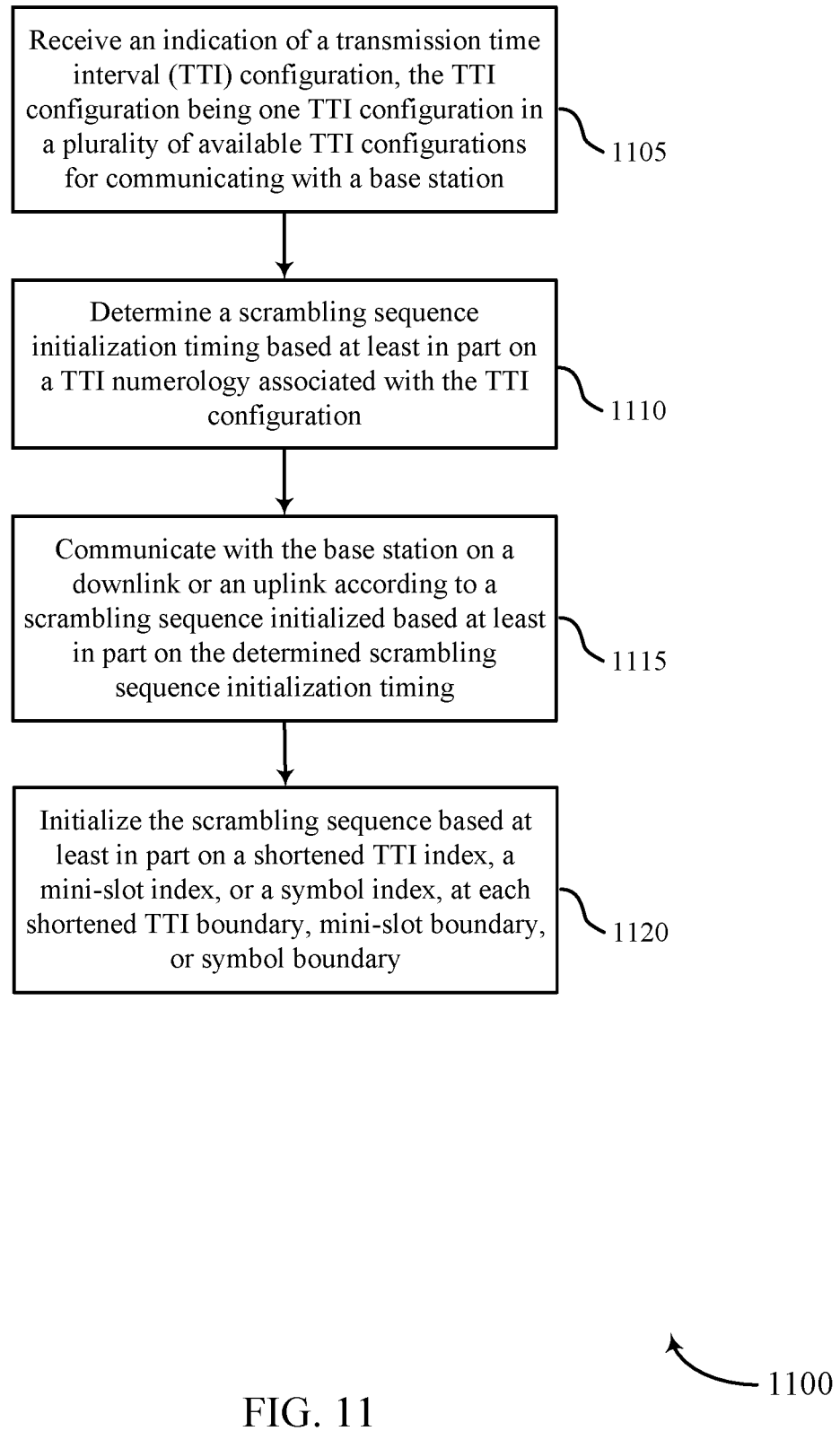
FIG. 11 is a flow chart illustrating an example of a method for wireless communication at a UE, in accordance with various aspects of the present disclosure.

FIG. 11 is a flow chart illustrating an example of a method 1100 for wireless communication at a UE, in accordance with various aspects of the present disclosure. For clarity, the method 1100 is described below with reference to aspects of one or more of the UEs described with reference to FIGS. 1, 3, and 8, aspects of the apparatus described with reference to FIG. 4, or aspects of one or more of the wireless communication managers described with reference to FIGS. 4, 5, and 8. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include receiving an indication of a TTI configuration, as described for example with reference to FIGS. 2 and 3. The TTI configuration may be one TTI configuration in a plurality of available TTI configurations for communicating with a base station. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof. In some examples, the operation(s) at block 1105 may be performed using the TTI configuration manager described with reference to FIGS. 4 and 5.

At block 1110, the method 1100 may include determining a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the TTI configuration is identified as a TTI configuration based at least in part on a shortened TTI, and in some examples, the TTI numerology may be identified as a shortened TTI index or symbol index. When the TTI configuration is identified as a TTI configuration based at least in part on a mini-slot, and in some examples, the TTI numerology may be identified as a mini-slot index or symbol index. In some examples, the operation(s) at block 1110 may be performed using the scrambling sequence manager described with reference to FIGS. 4 and 5.

At block 1115, the method 1100 may include communicating with the base station on a downlink or an uplink according to a scrambling sequence initialized based at least in part on the determined scrambling sequence initialization timing, as described for example with reference to FIGS. 2 and 3. In some examples, the communicating may include receiving a downlink transmission that is scrambled according to the scrambling sequence, and descrambling the downlink transmission. In some examples, the communicating may include scrambling and transmitting an uplink transmission according to the scrambling sequence. In some examples, the operation(s) at block 1115 may be performed using the downlink transmission manager or uplink transmission manager described with reference to FIGS. 4 and 5.

At block 1120, and in association with the communicating at block 1115, the method 1100 may include initializing the scrambling sequence based at least in part on a shortened TTI index, a mini-slot index, or a symbol index, at each shortened TTI boundary, mini-slot boundary, or symbol boundary. In some examples, the scrambling sequence may also or alternatively be initialized based at least in part on whether a transmission to be descrambled or scrambled is associated with an initial transmission or with a particular retransmission in a set of one or more retransmissions. In some examples, the operation(s) at block 1120 may be performed using the scrambling sequence manager described with reference to FIGS. 4 and 5.

In some examples of the method 1100, the scrambling sequence initialization timing may be associated with a downlink data channel, and communicating according to the scrambling sequence may include descrambling the downlink data channel based at least in part on the scrambling sequence. In some of these examples, the operation(s) at block 1120 may include initializing the scrambling sequence based at least in part on whether the downlink data channel is associated with an initial transmission or with a particular retransmission in a set of one or more retransmissions.

In some examples of the method 1100, the scrambling sequence initialization timing may be associated with a downlink control channel, and communicating according to the scrambling sequence may include descrambling the downlink control channel based at least in part on the scrambling sequence. In some of these examples, the operation(s) at block 1120 may include initializing the scrambling sequence based at least in part on whether the downlink control channel is associated with an initial transmission or with a particular retransmission in a set of one or more retransmissions. The method 1100 may also include identifying at least one cyclic shift associated with the downlink control channel. A cyclic shift may be identified based at least in part on a shortened TTI index, a mini-slot index, or a symbol index, at each shortened TTI boundary, mini-slot boundary, or symbol boundary.

In some examples of the method 1100, the scrambling sequence initialization timing may be associated with a downlink DMRS, and communicating according to the scrambling sequence may include descrambling the downlink DMRS based at least in part on the scrambling sequence. In some of these examples, the operation(s) at block 1120 may include initializing the scrambling sequence based at least in part on whether the downlink DMRS is associated with an initial transmission or with a particular retransmission in a set of one or more retransmissions.

In some examples of the method 1100, the scrambling sequence initialization timing may be associated with an uplink data channel, and communicating according to the scrambling sequence may include scrambling the uplink data channel based at least in part on the scrambling sequence. In some of these examples, the operation(s) at block 1120 may include initializing the scrambling sequence based at least in part on whether the uplink data channel is associated with an initial transmission or with a particular retransmission in a set of one or more retransmissions.

In some examples of the method 1100, the scrambling sequence initialization timing may be associated with an uplink control channel, and communicating according to the scrambling sequence may include scrambling the uplink control channel based at least in part on the scrambling sequence.

In some examples of the method 1100, the scrambling sequence initialization timing may be associated with an uplink DMRS, and communicating according to the scrambling sequence may include determining a hopping sequence of the uplink DMRS based at least in part on the scrambling sequence. In some examples, initializing the scrambling sequence may include initializing at least one of a sequence-group number on which the hopping sequence is based, a sequence number on which the hopping sequence is based, or a combination thereof. In some examples, the method 1100 may include cyclically shifting the uplink DMRS based at least in part on a shortened TTI index, a mini-slot index, or a symbol index. The cyclic shift may be updated at each shortened TTI boundary, mini-slot boundary, or symbol boundary. In some of these examples, the operation(s) at block 1120 may include initializing the scrambling sequence based at least in part on whether the uplink DMRS is associated with an initial transmission or with a particular retransmission in a set of one or more retransmissions.

Figure 12:
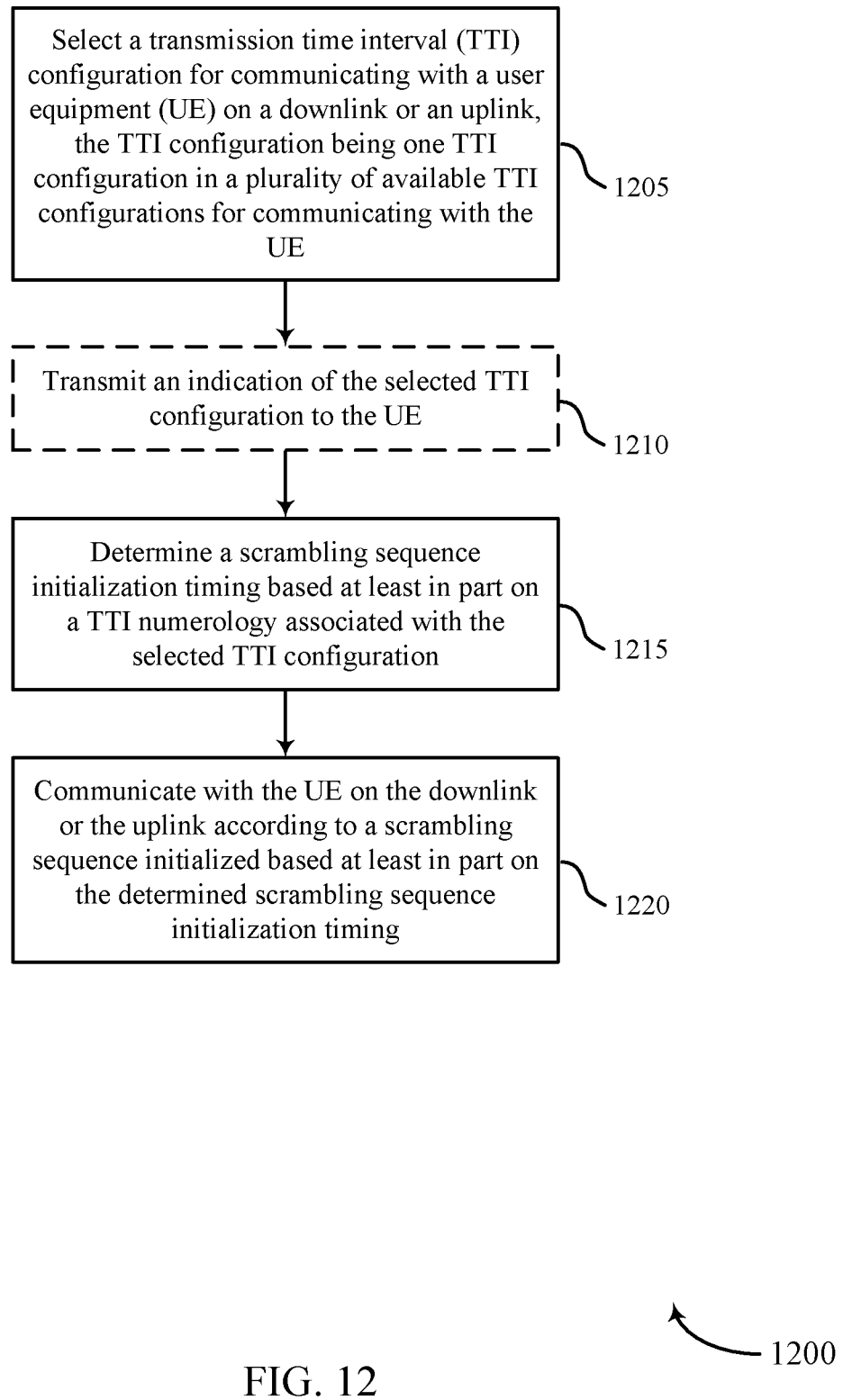
FIG. 12 is a flow chart illustrating an example of a method for wireless communication at a base station, in accordance with various aspects of the present disclosure.

FIG. 12 is a flow chart illustrating an example of a method 1200 for wireless communication at a base station, in accordance with various aspects of the present disclosure. For clarity, the method 1200 is described below with reference to aspects of one or more of the base stations described with reference to FIGS. 1, 3, and 9, aspects of the apparatus described with reference to FIG. 6, or aspects of one or more of the wireless communication managers described with reference to FIGS. 6, 7, and 9. In some examples, a base station may execute one or more sets of codes to control the functional elements of the base station to perform the functions described below. Additionally or alternatively, the base station may perform one or more of the functions described below using special-purpose hardware.

At block 1205, the method 1200 may include selecting a TTI configuration for communicating with a UE on a downlink or an uplink, as described for example with reference to FIGS. 2 and 3. The TTI configuration may be one TTI configuration in a plurality of available TTI configurations for communicating with the UE. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof. In some examples, the operation(s) at block 1205 may be performed using the TTI configuration selector described with reference to FIGS. 6 and 7.

At block 1210, the method 1200 may optionally include transmitting an indication of the selected TTI configuration to the UE, as described with reference to FIGS. 2 and 3. In other examples of the method, the indication of the selected TTI configuration may be transmitted to the UE in conjunction with the communication(s) at block 1220. In some examples, the operation(s) at block 1210 may be performed using the TTI configuration indicator described with reference to FIGS. 6 and 7.

At block 1215, the method 1200 may include determining a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the selected TTI configuration is a TTI configuration based at least in part on a shortened TTI, and in some examples, the TTI numerology may be identified as a shortened TTI index or symbol index. When the selected TTI configuration is a TTI configuration based at least in part on a mini-slot, and in some examples, the TTI numerology may be identified as a mini-slot index or symbol index. In some examples, the operation(s) at block 1215 may be performed using the scrambling sequence manager described with reference to FIGS. 6 and 7.

At block 1220, the method 1200 may include communicating with the UE on the downlink or the uplink according to a scrambling sequence initialized based at least in part on the determined scrambling sequence initialization timing, as described for example with reference to FIGS. 2 and 3. In some examples, the communicating may include scrambling and transmitting a downlink transmission according to the scrambling sequence. In some examples, the communicating may include receiving an uplink transmission that is scrambled according to the scrambling sequence, and descrambling the uplink transmission. In some examples, the operation(s) at block 1220 may be performed using the downlink transmission manager or uplink transmission manager described with reference to FIGS. 6 and 7.

Figure 13:
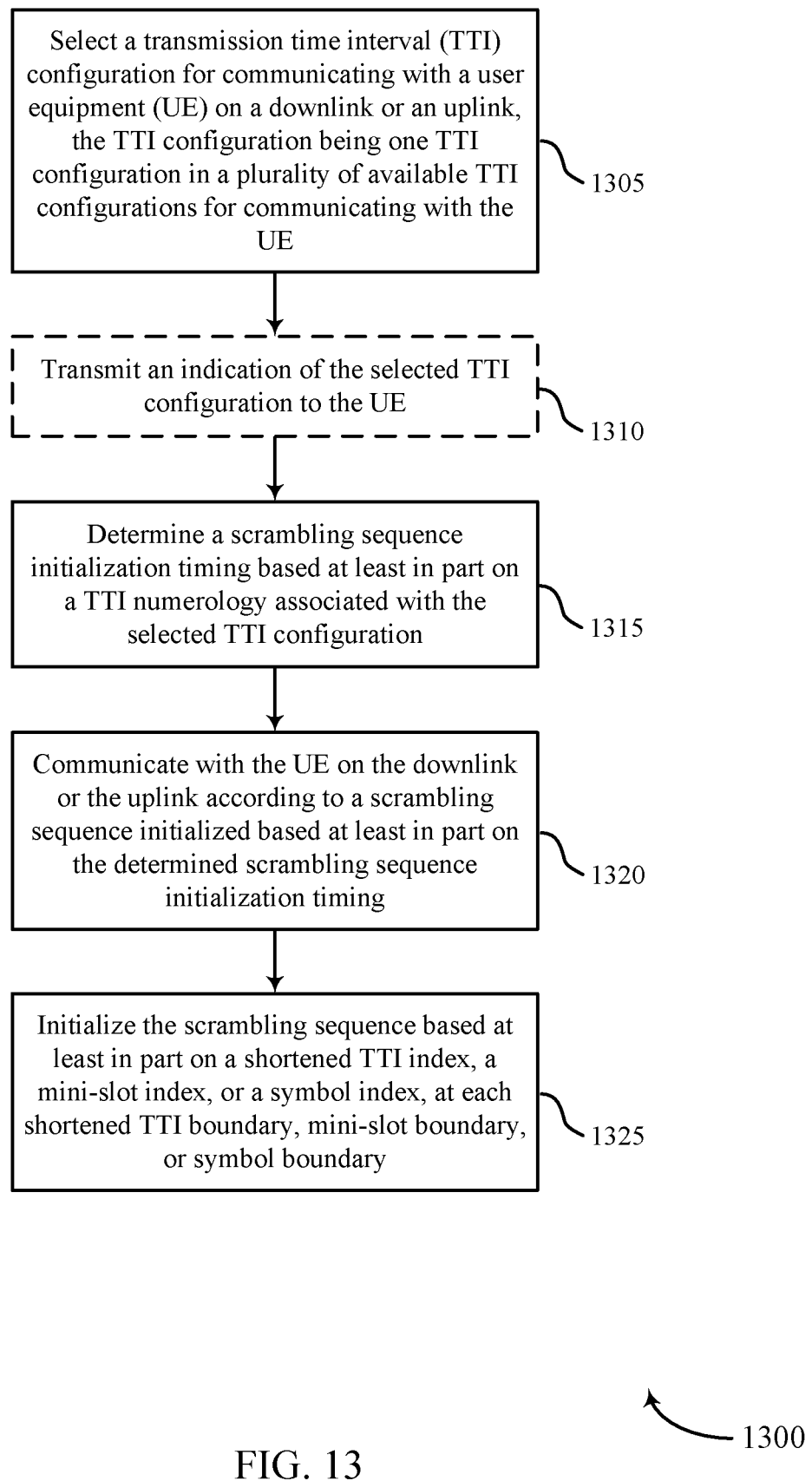
FIG. 13 is a flow chart illustrating an example of a method for wireless communication at a base station, in accordance with various aspects of the present disclosure.

FIG. 13 is a flow chart illustrating an example of a method 1300 for wireless communication at a base station, in accordance with various aspects of the present disclosure. For clarity, the method 1300 is described below with reference to aspects of one or more of the base stations described with reference to FIGS. 1, 3, and 9, aspects of the apparatus described with reference to FIG. 6, or aspects of one or more of the wireless communication managers described with reference to FIGS. 6, 7, and 9. In some examples, a base station may execute one or more sets of codes to control the functional elements of the base station to perform the functions described below. Additionally or alternatively, the base station may perform one or more of the functions described below using special-purpose hardware.

At block 1305, the method 1300 may include selecting a TTI configuration for communicating with a UE on a downlink or an uplink, as described for example with reference to FIGS. 2 and 3. The TTI configuration may be one TTI configuration in a plurality of available TTI configurations for communicating with the UE. In some examples, the plurality of available TTI configurations may include a first TTI configuration based at least in part on a maximum length TTI, and a second TTI configuration based at least in part on a shortened TTI, with the shortened TTI having a shorter duration than the maximum length TTI. In some examples, the plurality of available TTI configurations may include a first TTI configuration based at least in part on a slot, and a second TTI configuration based at least in part on a mini-slot, with the mini-slot having a shorter duration than the slot. In some examples, the plurality of available TTI configurations may include at least one of a first TTI configuration associated with LTE ULL communication, a second TTI configuration associated with LTE HRLLC, a third TTI configuration associated with NR URLLC, or a combination thereof. In some examples, the operation(s) at block 1305 may be performed using the TTI configuration selector described with reference to FIGS. 6 and 7.

At block 1310, the method 1300 may optionally include transmitting an indication of the selected TTI configuration to the UE, as described with reference to FIGS. 2 and 3. In other examples of the method, the indication of the selected TTI configuration may be transmitted to the UE in conjunction with the communication(s) at block 1320. In some examples, the operation(s) at block 1310 may be performed using the TTI configuration indicator described with reference to FIGS. 6 and 7.

At block 1315, the method 1300 may include determining a scrambling sequence initialization timing based at least in part on a TTI numerology associated with the TTI configuration, as described for example with reference to FIGS. 2 and 3. In some examples, the TTI numerology may include a shortened TTI index, a mini-slot index, or a symbol index. When the selected TTI configuration is a TTI configuration based at least in part on a shortened TTI, and in some examples, the TTI numerology may be identified as a shortened TTI index or symbol index. When the selected TTI configuration is a TTI configuration based at least in part on a mini-slot, and in some examples, the TTI numerology may be identified as a mini-slot index or symbol index. In some examples, the operation(s) at block 1315 may be performed using the scrambling sequence manager described with reference to FIGS. 6 and 7.

At block 1320, the method 1300 may include communicating with the UE on the downlink or the uplink according to a scrambling sequence initialized based at least in part on the determined scrambling sequence initialization timing, as described for example with reference to FIGS. 2 and 3. In some examples, the communicating may include scrambling and transmitting a downlink transmission according to the scrambling sequence. In some examples, the communicating may include receiving an uplink transmission that is scrambled according to the scrambling sequence, and descrambling the uplink transmission. In some examples, the operation(s) at block 1320 may be performed using the downlink transmission manager or uplink transmission manager described with reference to FIGS. 6 and 7.

At block 1325, and in association with the communicating at block 1320, the method 1300 may include initializing the scrambling sequence based at least in part on a shortened TTI index, a mini-slot index, or a symbol index, at each shortened TTI boundary, mini-slot boundary, or symbol boundary. In some examples, the scrambling sequence may also or alternatively be initialized based at least in part on whether a transmission to be scrambled or descrambled is associated with an initial transmission or with a particular retransmission in a set of one or more retransmissions. In some examples, the operation(s) at block 1325 may be performed using the scrambling sequence manager described with reference to FIGS. 6 and 7.

In some examples of the method 1300, the scrambling sequence initialization timing may be associated with a downlink data channel, and communicating according to the scrambling sequence may include scrambling the downlink data channel based at least in part on the scrambling sequence. In some of these examples, the operation(s) at block 1325 may include initializing the scrambling sequence based at least in part on whether the downlink data channel is associated with an initial transmission or with a particular retransmission in a set of one or more retransmissions.

In some examples of the method 1300, the scrambling sequence initialization timing may be associated with a downlink control channel, and communicating according to the scrambling sequence may include scrambling the downlink control channel based at least in part on the scrambling sequence. In some of these examples, the operation(s) at block 1325 may include initializing the scrambling sequence based at least in part on whether the downlink control channel is associated with an initial transmission or with a particular retransmission in a set of one or more retransmissions. The method 1300 may also include cyclically shifting the downlink control channel. A cyclic shift may be updated based at least in part on a shortened TTI index, a mini-slot index, or a symbol index, at each shortened TTI boundary, mini-slot boundary, or symbol boundary.

In some examples of the method 1300, the scrambling sequence initialization timing may be associated with a downlink DMRS, and communicating according to the scrambling sequence may include scrambling the downlink DMRS based at least in part on the scrambling sequence. In some of these examples, the operation(s) at block 1325 may include initializing the scrambling sequence based at least in part on whether the downlink DMRS is associated with an initial transmission or with a particular retransmission in a set of one or more retransmissions.

In some examples of the method 1300, the scrambling sequence initialization timing may be associated with an uplink data channel, and communicating according to the scrambling sequence may include descrambling the uplink data channel based at least in part on the scrambling sequence. In some of these examples, the operation(s) at block 1325 may include initializing the scrambling sequence based at least in part on whether the uplink data channel is associated with an initial transmission or with a particular retransmission in a set of one or more retransmissions.

In some examples of the method 1300, the scrambling sequence initialization timing may be associated with an uplink control channel, and communicating according to the scrambling sequence may include descrambling the uplink control channel based at least in part on the scrambling sequence.

In some examples of the method 1300, the scrambling sequence initialization timing may be associated with an uplink DMRS, and communicating according to the scrambling sequence may include determining a hopping sequence of the uplink DMRS based at least in part on the scrambling sequence. In some examples, initializing the scrambling sequence may include initializing at least one of a sequence-group number on which the hopping sequence is based, a sequence number on which the hopping sequence is based, or a combination thereof. In some examples, the method 1300 may include identifying at least one cyclic shift associated with the uplink DMRS. A cyclic shift may be identified based at least in part on a shortened TTI index, a mini-slot index, or a symbol index, at each shortened TTI boundary, mini-slot boundary, or symbol boundary. In some examples, the operation(s) at block 1325 may include initializing the scrambling sequence based at least in part on whether the uplink DMRS is associated with an initial transmission or with a particular retransmission in a set of one or more retransmissions.

The methods 1000, 1100, 1200, and 1300 described with reference to FIGS. 11-13 may provide for wireless communication. It should be noted that the methods are example implementations of some of the techniques described in the present disclosure, and the operations of the methods may be rearranged, combined with other operations of the same or different method, or otherwise modified, such that other implementations are possible. In some examples, operations may be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
receiving an indication of a transmission time interval (TTI) configuration, the TTI configuration being one TTI configuration in a plurality of available TTI configurations for communicating with a base station;

determining a scrambling sequence initialization timing based at least in part on a mathematical product of a cell identity and a TTI numerology associated with the TTI configuration; and communicating with the base station on a downlink or an uplink according to a scrambling sequence initialized based at least in part on the determined scrambling sequence initialization timing.

2. The method of claim 1, wherein the plurality of available TTI configurations comprises a first TTI configuration based at least in part on a maximum length TTI, and a second TTI configuration based at least in part on a shortened TTI, the shortened TTI having a shorter duration than the maximum length TTI, the method further comprising:

identifying the TTI configuration as the second TTI configuration; and identifying the TTI numerology as a shortened TTI index.

3. The method of claim 1, wherein the plurality of available TTI configurations comprises a first TTI configuration based at least in part on a slot, and a second TTI configuration based at least in part on a mini-slot, the mini-slot having a shorter duration than the slot, the method further comprising:

identifying the TTI configuration as the second TTI configuration; and identifying the TTI numerology as a mini-slot index.

4. The method of claim 1, wherein the plurality of available TTI configurations comprises at least one of: a first TTI configuration associated with Long Term Evolution (LTE) ultra low latency (ULL) communication, a second TTI configuration associated with LTE highly ultra reliable low latency communication (HRLLC), a third TTI configuration associated with New Radio (NR) ultra-reliable low latency communication (URLLC), or a combination thereof, the method further comprising:

identifying the TTI configuration associated with at least one resource grant as the first TTI configuration, the second TTI configuration, or the third TTI configuration.

5. The method of claim 1, wherein the TTI numerology comprises a shortened TTI index, a mini-slot index, or a symbol index.

6. The method of claim 1, wherein the scrambling sequence initialization timing is associated with a downlink data channel, and communicating according to the scrambling sequence comprises:

descrambling the downlink data channel based at least in part on the scrambling sequence.

7. The method of claim 6, further comprising:

initializing the scrambling sequence based at least in part on a shortened TTI index, a mini-slot index, or a symbol index, at each shortened TTI boundary, mini-slot boundary, or symbol boundary.

8. The method of claim 6, further comprising:

initializing the scrambling sequence based at least in part on whether the downlink data channel is associated with an initial transmission or with a particular retransmission in a set of one or more retransmissions.

9. The method of claim 1, wherein the scrambling sequence initialization timing is associated with a downlink control channel, and communicating according to the scrambling sequence comprises:

descrambling the downlink control channel based at least in part on the scrambling sequence.

10. The method of claim 9, further comprising:

initializing the scrambling sequence based at least in part on a shortened TTI index, a mini-slot index, or a symbol index, at each shortened TTI boundary, mini-slot boundary, or symbol boundary.

11. The method of claim 9, further comprising:

identifying at least one cyclic shift associated with the downlink control channel based at least in part on a shortened TTI index, a mini-slot index, or a symbol index, at each shortened TTI boundary, mini-slot boundary, or symbol boundary.

12. The method of claim 9, further comprising:

initializing the scrambling sequence based at least in part on whether the downlink control channel is associated with an initial transmission or with a particular retransmission in a set of one or more retransmissions.

13. The method of claim 1, wherein the scrambling sequence initialization timing is associated with a downlink demodulation reference signal (DMRS), and communicating according to the scrambling sequence comprises:

descrambling the downlink DMRS based at least in part on the scrambling sequence.

14. The method of claim 13, further comprising:

initializing the scrambling sequence based at least in part on a shortened TTI index, a mini-slot index, or a symbol index, at each shortened TTI boundary, mini-slot boundary, or symbol boundary.

15. The method of claim 1, wherein the scrambling sequence initialization timing is associated with an uplink data channel, and communicating according to the scrambling sequence comprises:

scrambling the uplink data channel based at least in part on the scrambling sequence.

16. The method of claim 15, further comprising:

initializing the scrambling sequence based at least in part on a shortened TTI index, a mini-slot index, or a symbol index, at each shortened TTI boundary, mini-slot boundary, or symbol boundary.

17. The method of claim 15, further comprising:

initializing the scrambling sequence based at least in part on whether the uplink data channel is associated with an initial transmission or with a particular retransmission in a set of one or more retransmissions.

18. The method of claim 1, wherein the scrambling sequence initialization timing is associated with an uplink control channel, and communicating according to the scrambling sequence comprises:

scrambling the uplink control channel based at least in part on the scrambling sequence.

19. The method of claim 18, further comprising:

initializing the scrambling sequence based at least in part on a shortened TTI index, a mini-slot index, or a symbol index, at each shortened TTI boundary, mini-slot boundary, or symbol boundary.

20. The method of claim 1, wherein the scrambling sequence initialization timing is associated with an uplink demodulation reference signal (DMRS), and communicating according to the scrambling sequence comprises:

determining a hopping sequence of the uplink DMRS based at least in part on the scrambling sequence.

21. The method of claim 20, further comprising:

initializing the scrambling sequence based at least in part on a shortened TTI index, a mini-slot index, or a symbol index, at each shortened TTI boundary, mini-slot boundary, or symbol boundary.

22. The method of claim 21, wherein initializing the scrambling sequence comprises initializing at least one of a sequence-group number on which the hopping sequence is based, a sequence number on which the hopping sequence is based, or a combination thereof.

23. The method of claim 22, further comprising:
cyclically shifting the uplink DMRS based at least in part on a shortened TTI index, a mini-slot index, or a symbol index, at each shortened TTI boundary, mini-slot boundary, or symbol boundary.

24. An apparatus for wireless communication at a user equipment (UE), comprising:
a processor;
memory coupled with the processor; and
instructions stored in the memory, the instructions being executable by the processor to:
receive an indication of a transmission time interval (TTI) configuration, the TTI configuration being one TTI configuration in a plurality of available TTI configurations for communicating with a base station;
determine a scrambling sequence initialization timing based at least in part on a mathematical product of a cell identity and a TTI numerology associated with the TTI configuration; and
communicate with the base station on a downlink or an uplink according to a scrambling sequence initialized based at least in part on the determined scrambling sequence initialization timing.

25. The apparatus of claim 24, wherein the plurality of available TTI configurations comprises a first TTI configuration based at least in part on a maximum length TTI, and a second TTI configuration based at least in part on a shortened TTI, the shortened TTI having a shorter duration than the maximum length TTI, and the instructions are executable by the processor to:
identify the TTI configuration as the second TTI configuration; and
identify the TTI numerology as a shortened TTI index.

26. The apparatus of claim 24, wherein the plurality of available TTI configurations comprises a first TTI configuration based at least in part on a slot, and a second TTI configuration based at least in part on a mini-slot, the mini-slot having a shorter duration than the slot, and the instructions are executable by the processor to:
identify the TTI configuration as the second TTI configuration; and
identify the TTI numerology as a mini-slot index.

27. The apparatus of claim 24, wherein the plurality of available TTI configurations comprises at least one of: a first TTI configuration associated with Long Term Evolution (LTE) ultra low latency (ULL) communication, a second TTI configuration associated with LTE highly ultra reliable low latency communication (HRLLC), a third TTI configuration associated with New Radio (NR) ultra-reliable low latency communication (URLLC), or a combination thereof, and the instructions are executable by the processor to:
identify the TTI configuration associated with at least one resource grant as the first TTI configuration, the second TTI configuration, or the third TTI configuration.

28. The apparatus of claim 24, wherein the TTI numerology comprises a shortened TTI index, a mini-slot index, or a symbol index.

29. An apparatus for wireless communication at a user equipment (UE), comprising:
means for receiving an indication of a transmission time interval (TTI) configuration, the TTI configuration being one TTI configuration in a plurality of available TTI configurations for communicating with a base station;
means for determining a scrambling sequence initialization timing based at least in part on a mathematical product of a cell identity and a TTI numerology associated with the TTI configuration; and
means for communicating with the base station on a downlink or an uplink according to a scrambling sequence initialized based at least in part on the determined scrambling sequence initialization timing.

30. A non-transitory computer-readable medium storing computer-executable code for wireless communication at a user equipment (UE), the code executable by a processor to:
receive an indication of a transmission time interval (TTI) configuration, the TTI configuration being one TTI configuration in a plurality of available TTI configurations for communicating with a base station;
determine a scrambling sequence initialization timing based at least in part on a mathematical product of a cell identity and a TTI numerology associated with the TTI configuration; and
communicate with the base station on a downlink or an uplink according to a scrambling sequence initialized based at least in part on the determined scrambling sequence initialization timing.

* * * * *